(12) United States Patent
Han et al.

(10) Patent No.: US 8,358,279 B2
(45) Date of Patent: Jan. 22, 2013

(54) SENSATION SYSTEM

(75) Inventors: Chang Kyu Han, Seoul (KR); Jun Ho Gohng, Gyeonggi-do (KR); Dae Woo Kwon, Gyeonggi-do (KR)

(73) Assignee: Daesung Electric Co., Ltd, Gyunggi Province (KR)

( * ) Notice: Subject to any disclaimer, the term of this patent is extended or adjusted under 35 U.S.C. 154(b) by 1162 days.

(21) Appl. No.: 12/141,755

(22) Filed: Jun. 18, 2008

(65) Prior Publication Data

US 2009/0140993 A1 Jun. 4, 2009

(30) Foreign Application Priority Data

Nov. 29, 2007 (KR) .......................... 10-2007-0123104
Mar. 21, 2008 (KR) .......................... 10-2008-0026626

(51) Int. Cl.
*G06F 3/041* (2006.01)
(52) U.S. Cl. ......... 345/173; 345/168; 345/597; 310/317
(58) Field of Classification Search .................. 345/173, 345/168, 597; 310/317
See application file for complete search history.

(56) References Cited

U.S. PATENT DOCUMENTS

| 4,803,362 | A | 2/1989 | Butts | |
|---|---|---|---|---|
| 7,385,588 | B2 * | 6/2008 | Phillips et al. ................ | 345/168 |
| 2004/0012560 | A1 | 1/2004 | Jasso et al. | |
| 2006/0170700 | A1 * | 8/2006 | Hoelscher et al. ............. | 345/597 |
| 2006/0255683 | A1 * | 11/2006 | Suzuki et al. ................. | 310/317 |
| 2006/0279554 | A1 * | 12/2006 | Shin et al. ..................... | 345/173 |

FOREIGN PATENT DOCUMENTS

| CN | 1811538 A | 8/2006 |
|---|---|---|
| JP | 64-022011 | 1/1989 |
| JP | 06-004941 A | 1/1994 |
| JP | 2003-281972 A | 10/2003 |
| JP | 2003-295959 A | 10/2003 |
| KR | 2004-0044075 A | 5/2004 |
| KR | 2006-0036710 A | 5/2006 |

* cited by examiner

*Primary Examiner* — Amare Mengistu
*Assistant Examiner* — Joseph G Rodriguez
(74) *Attorney, Agent, or Firm* — Rabin & Berdo, P.C.

(57) ABSTRACT

The present invention provides a sensation system comprising: a system housing; a haptic switching unit mounted at the system housing and having a haptic actuator for performing a haptic function in response to an electrical signal being inputted; a system control section electrically connected with the haptic switching unit for generating a control signal therefrom to control the haptic switching unit; and a light-emitting section electrically connected with the system control section for emitting light corresponding to each operation of the haptic switching unit in response to the control signal generated from the system control section in cooperation with the haptic switching unit. In addition, the present invention provides a sensation system comprising: a mode unit for performing a preset mode function in response to an electrical signal being inputted; a system control section electrically connected with the mode unit for generating a control signal therefrom to control the mode unit; and a light-emitting section electrically connected with the system control for emitting light corresponding to each operation of the mode unit in response to the control signal generated from the system control section in cooperation with the mode unit.

21 Claims, 27 Drawing Sheets

SENSATION SYSTEM

CROSS-REFERENCE TO RELATED APPLICATIONS

This application claims the benefit under 35 U.S.C. §119(a) of Korean Patent Application No. 10-2007-0123104, filed in the Korean Intellectual Property Office on Nov. 29, 2007, and Korean Patent Application No. 10-2008-0026626, filed in the Korean Intellectual Property Office on Mar. 21, 2008, the entire contents of which are incorporated herein by reference.

BACKGROUND OF THE INVENTION (a) Field of the Invention

The present invention relates to a recognition device, and more particularly, to a sensation system which includes an actuator as haptic recognition device for allowing a user to feel vibration and rotation resistance and a device for enabling a sensory recognition besides the haptic recognition.

(b) Background Art

Owing to the development of technologies, devices performing a variety of functions are being converged in a single device.

By such a converging effect, the single device can carry out various functions, but there occurs a problem in that since the use of the single device is complicated and multi-staged, the technological development for convenience of users rather makes it difficult for the users to utilize the single device. In order to address and solve this difficulty, various researches and developments are in progress to improve a cognitive function of the users.

Particularly, in case where a user manipulates a separate device during the driving operation requiring a driving concentration such as vehicles, a problem may be caused in that there is a high possibility of occurrence of a safety accident due to a degradation of the driving concentration of the user, etc. That is, in case where a complex function is equipped in a to-be-manipulated device of a vehicle being driven, for example, the complex function including navigation control, seat temperature control, ventilation control and so forth as well as volume control is integrated into a single haptic device, a hierarchical interface structure is inevitably provided in the haptic device. In this case, in order for a user to perceive whether not an operation for a corresponding operating mode is well performed, he or she should watch a display device, etc., which results in a weakness of his or her frontward attention to thereby likely to bring about the occurrence of a safety accident.

The information disclosed in this background of the invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made in an effort to solve the aforementioned problems occurring in the prior art, and it is an object of the present invention to provide a sensation system which enables for status display based on a visual recognition so as to allow a user to more easily and rapidly perceive a recognition range for the status display of a corresponding operating mode for the corresponding operating mode.

To accomplish the above object, in one aspect, the present invention provides a sensation system including: a system housing; a haptic switching unit mounted at the system housing and having a haptic actuator for performing a haptic function in response to an electrical signal being inputted; a system control section electrically connected with the haptic switching unit for generating a control signal therefrom to control the haptic switching unit; and a light-emitting section electrically connected with the system control section for emitting light corresponding to each operation of the haptic switching unit in response to the control signal generated from the system control section in cooperation with the haptic switching unit.

In the sensation system, the light-emitting section may include a light-emitting source for generating light in response to the control signal of the system control section, and the light-emitting source may include at least one of a light-emitting diode (LED), an organic electroluminescent (EL) device and an inorganic electroluminescent device. Also, the light-emitting section may further include a system optical unit mounted at a housing of the haptic switching unit in such a fashion as to be disposed adjacent to the light-emitting source for allowing light emitted from the light-emitting source to exit to the outside. The system optical unit may include a ring-type system optical unit having a through-hole formed therein for allowing the haptic actuator to penetrate therethrough.

The light-emitting source may be disposed on a line having a maximum penetrating length of the ring-type system optical unit.

In addition, the ring-type system optical unit has an optical unit mounting protrusion formed on one surface thereof, and has an optical unit mounting protrusion-receiving portion formed on the inside surface of a unit housing included in the haptic switching unit to correspond to the optical unit mounting protrusion so as to be engaged with the optical unit mounting protrusion.

In the sensation system, the system optical unit may include a line-type system optical unit disposed adjacent to an outer circumference of the haptic actuator inside the unit housing. The light-emitting source may be provided in plural numbers so as to emit lights having different colors.

Moreover, the sensation system may further include a display unit mounted at the system housing and electrically connected with the haptic switching unit for displaying an operating state of the haptic switching unit. The light-emitting section further include: a light-emitting source disposed at the display unit; and a system optical unit mounted at the display unit in such a fashion as to be disposed adjacent to the light-emitting source for allowing light emitted from the light-emitting source to exit to the outside. The the control signal from the system control section to the light-emitting section may include a flickering signal for controlling light exiting from the light-emitting section. The sensation system further include an acoustic section electrically connected with the system control for generating an acoustic signal corresponding to each operation of the haptic switching unit in response to the control signal generated from the system control section in cooperation with the haptic switching unit.

To accomplish the above object, in another aspect, the present invention provides a sensation system including: a mode unit for performing a preset mode function in response to an electrical signal being inputted; a system control section electrically connected with the mode unit for generating a control signal therefrom to control the mode unit; and a light-emitting section electrically connected with the system control for emitting light corresponding to each operation of the mode unit in response to the control signal generated from the system control section in cooperation with the mode unit.

Also, the light-emitting section includes a light-emitting source for generating light in response to the control signal of the system control section.

In addition, the light-emitting source comprises at least one of a light-emitting diode (LED), an electroluminescent (EL) device, and the light-emitting section may further include a system optical unit mounted at a unit housing of the haptic switching unit in such a fashion as to be disposed adjacent to the light-emitting source for allowing light emitted from the light-emitting source to exit to the outside.

Moreover, the light-emitting source may be provided in plural numbers so as to emit lights having different colors, and the control signal from the system control section to the light-emitting section may include a flickering signal for controlling light exiting from the light-emitting section.

Besides, the sensation system may further include a display unit electrically connected with the mode unit for displaying an operating state of the mode unit. Also, the mode unit may further include a touch pad.

Also, the light-emitting section may further include: a light-emitting source for generating light in response to the control signal of the system control section; and a sensing section for sensing an ambient environment of the system control section. The sensing section may further include an illumination sensor for sensing an illumination of the ambient area of the light-emitting source. The the sensing section may further include a pressure sensor for sensing whether or not a pressure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
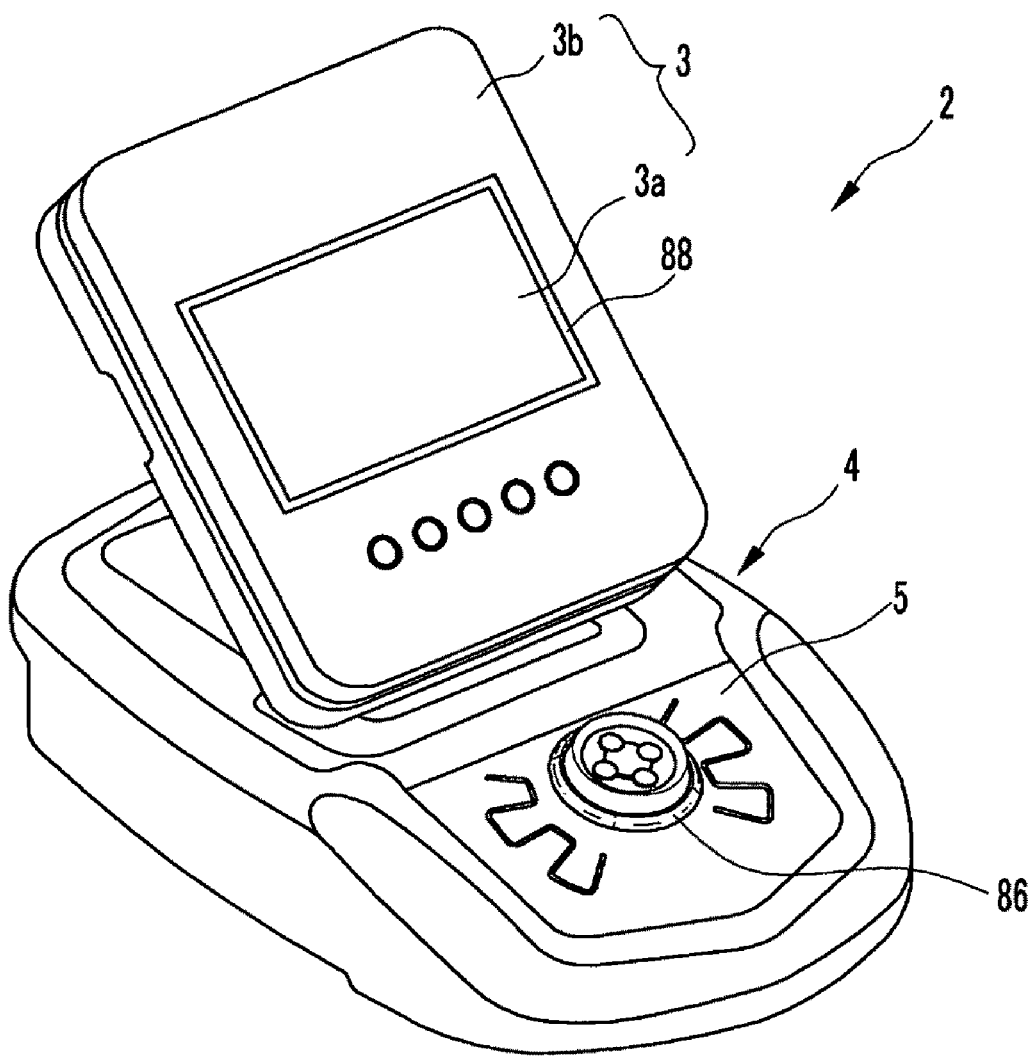
FIG. 1 is a schematic perspective view showing a sensation system according to one embodiment of the present invention.

Reference will now be made in detail to a sensation system according to the preferred embodiment of the present invention, examples of which are illustrated in the drawings attached hereinafter, wherein like reference numerals refer to like elements throughout. The embodiments are described below so as to explain the present invention by referring to the figures.

Figure 2:
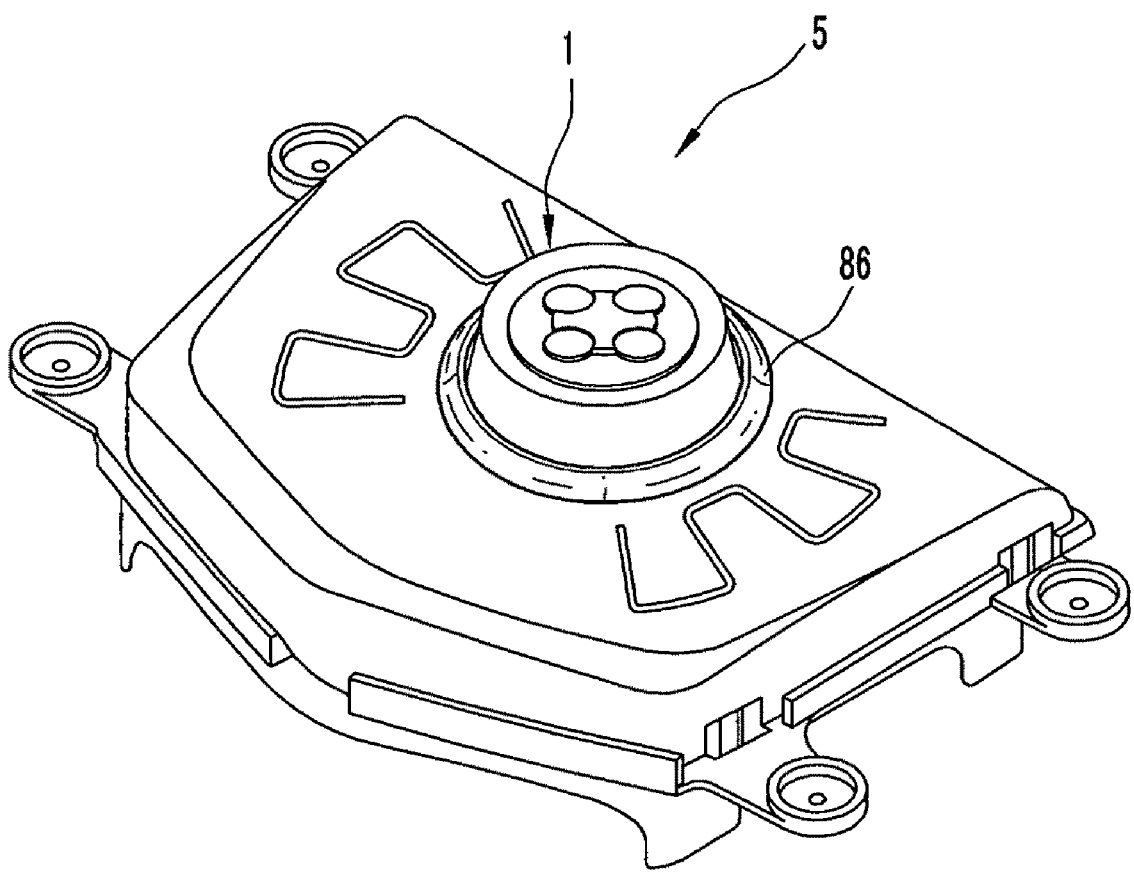
FIG. 2 is a schematic assembled perspective view showing a haptic switching unit according to one embodiment of the present invention.
Figure 3:
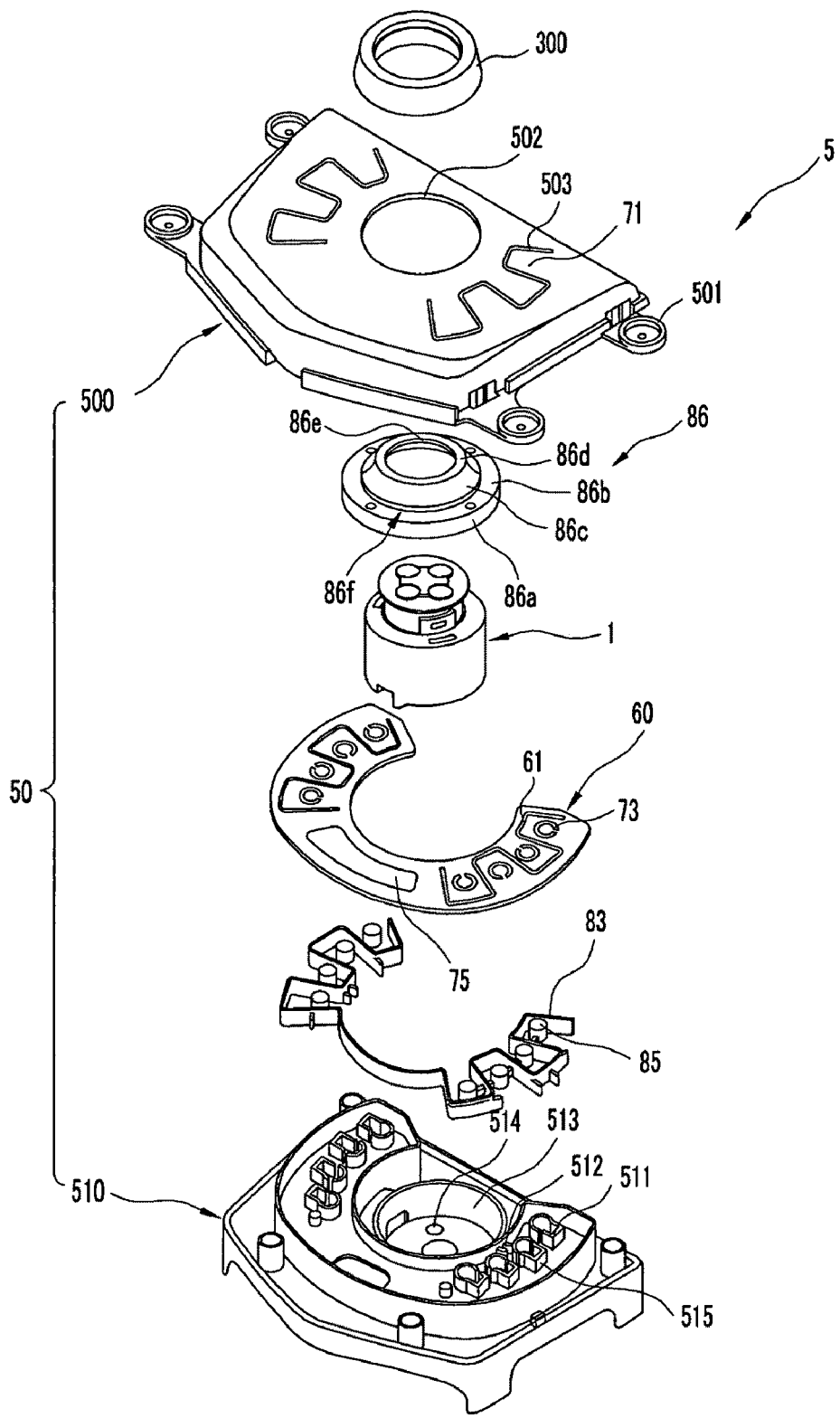
FIG. 3 is a schematic exploded perspective view showing the haptic switching unit of FIG. 2.
Figure 4:
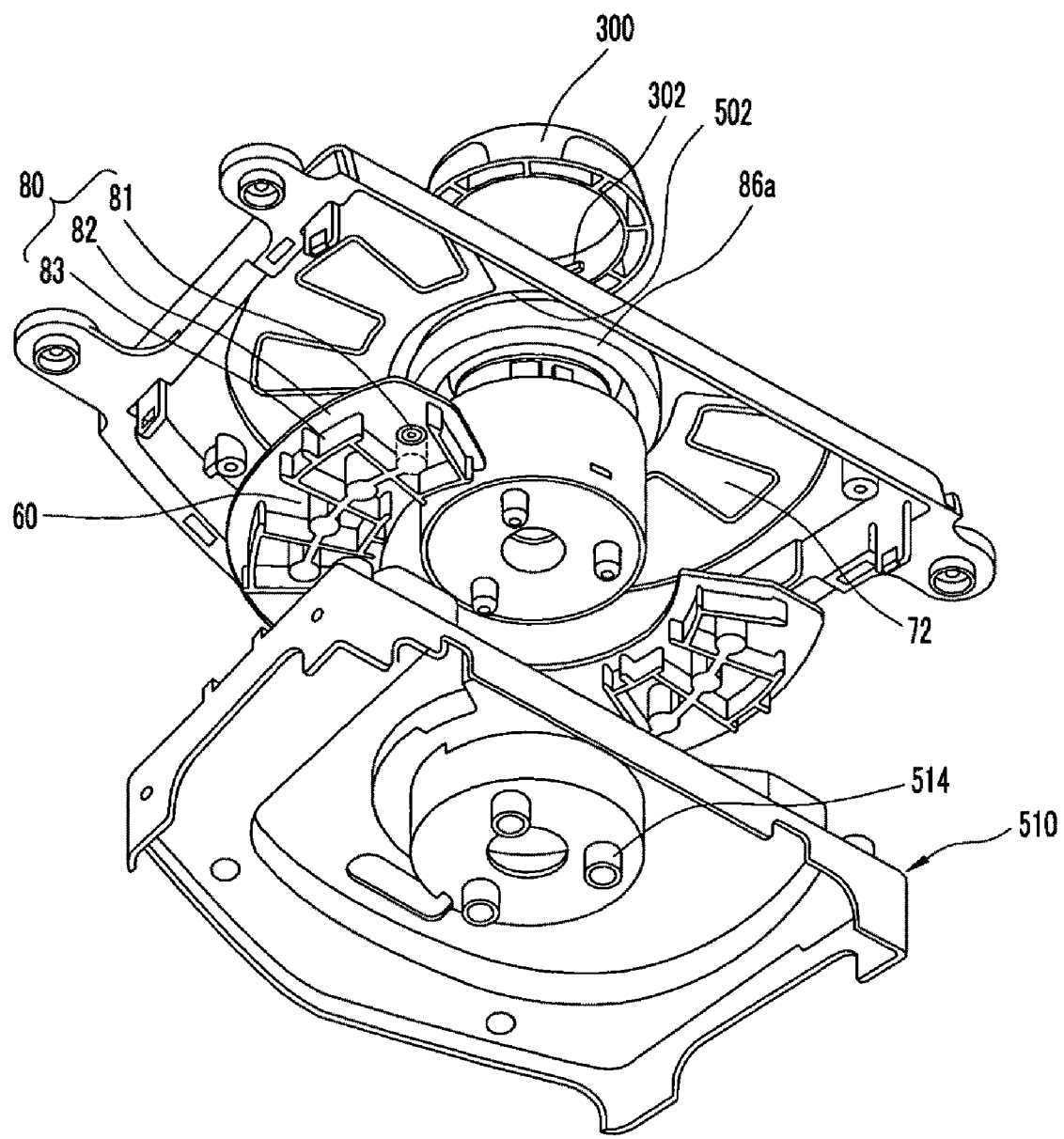
FIG. 4 is a schematic exploded perspective view showing the haptic switching unit of FIG. 3 when viewed from another angle.

FIG. 1 is a schematic perspective view showing a sensation system 2 according to one embodiment of the present invention. A switching unit as an example of a mode unit is included in the sensation system 2 according to one embodiment of the present invention. In this embodiment, the switching unit is composed of a haptic switching unit 5. FIG. 2 is a schematic assembled perspective view showing a haptic switching unit 5 as an example of a switching unit according to one embodiment of the present invention. FIG. 3 is a schematic exploded perspective view showing the haptic switching unit 5 of FIG. 2, and FIG. 4 is a schematic exploded perspective view showing the haptic switching unit 5 of FIG. 3 when viewed from another angle.

The sensation system 2 according to one embodiment of the present invention includes a system housing 4, a haptic switching unit 5 and a system control section 6. The haptic switching unit 5 includes a haptic actuator 1 for performing a haptic function in response to an electrical signal being inputted. The haptic switching unit 5 is mounted at the system housing 4 and is controlled by the system control section 6 disposed inside the system housing 4.

Also, at the system housing 4 is mounted a display unit 3 which displays as an image an operating state of the haptic switching unit 5 in response to a control signal generated from the system control section 6. In this case, although not shown in detail in the drawing, the display unit 3 may be mounted in a position variable structure which can allow a user to change a viewing angle relative to the system housing 4. In this embodiment, the display unit 3 is disposed adjacent to the haptic switching unit 5, but the display unit 3 and the haptic switching unit 5 may be variously configured depending on a design specification such as being spaced apart from each other by a considerable interval.

The haptic switching unit 5 includes a unit housing 50, a printed circuit board 60 and a haptic actuator 1. The haptic switching unit 5 may include a capacitance type switch section 70. The haptic switching unit 5 according to one embodiment of the present invention will be described based on a configuration having a capacitance type switch section 70. The unit housing 50 includes a housing body 500 and a housing base 510. The housing body 500 is engaged with the housing base 510 to define an internal space between the housing body 500 and the housing base 510. A snap-fit member is disposed in the housing body 500 and the housing base 510 so that they can be engaged with each other. Separate fastening means such as a bolt may be provided in the housing body 500 and the housing base 510 so as to join the housing body 500 and the housing base 510 to each other, if necessary.

The housing body 500 has a through-hole 502 formed therein so as to allow the haptic actuator 1 which will be described below to pass therethrough. In this case, the through-hole 502 is shown in the drawing in such a fashion as to be positioned at the center of the housing body 500, but may be formed at various locations depending on a design specification. A plurality of body mounting portions 501 is extendedly formed at lateral sides of the housing body 500 so that the housing body 50 is fixedly mounted at the system housing 4 through the body mounting portion 501.

The housing base 510 includes an accommodating portion 513 formed therein for allowing the haptic actuator 1 to be accommodated therein. The accommodating portion 513 has a mounting hole 514 penetratingly formed at the bottom thereof so that the haptic actuator 1 can be fixedly mounted to the housing base 510.

The printed circuit board 60 is disposed inside the unit housing 50. The printed circuit board 60 has a plurality of circuit wires (not shown) and electric devices disposed thereon so as to be electrically connected with the haptic actuator 1 and/or a capacitance type switch section 70 which will be described below. The housing base 510 includes an accommodating portion 511 formed thereon. The accommodating portion 511 has a seating portion 512 for stably supporting the printed circuit board 60.

The haptic actuator 1 includes a housing 10, a rotary switch section 30 and a printed circuit board 40.

Figure 7:
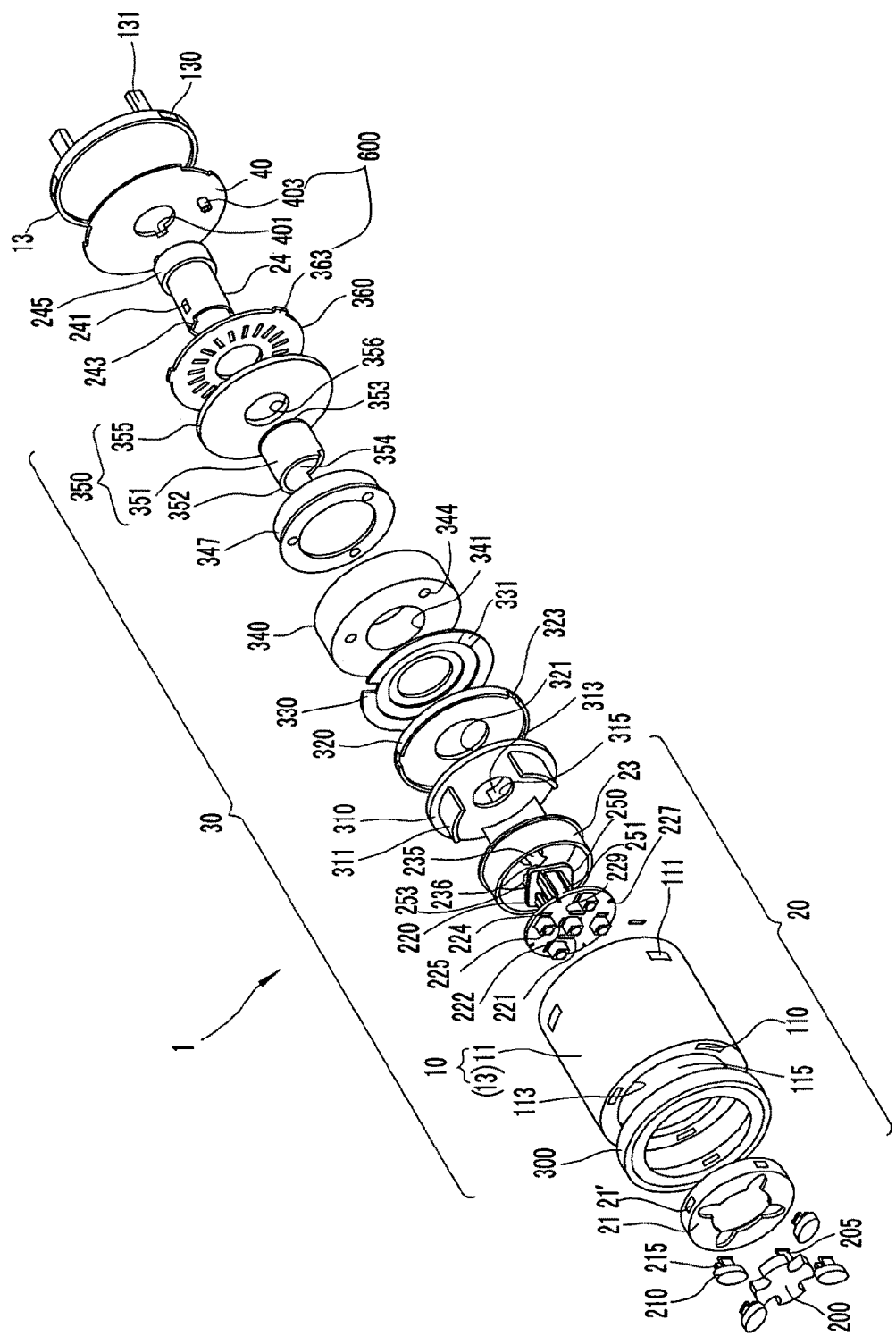
FIG. 7 is a schematic exploded perspective view showing a haptic actuator according to one embodiment of the present invention.
Figure 8:
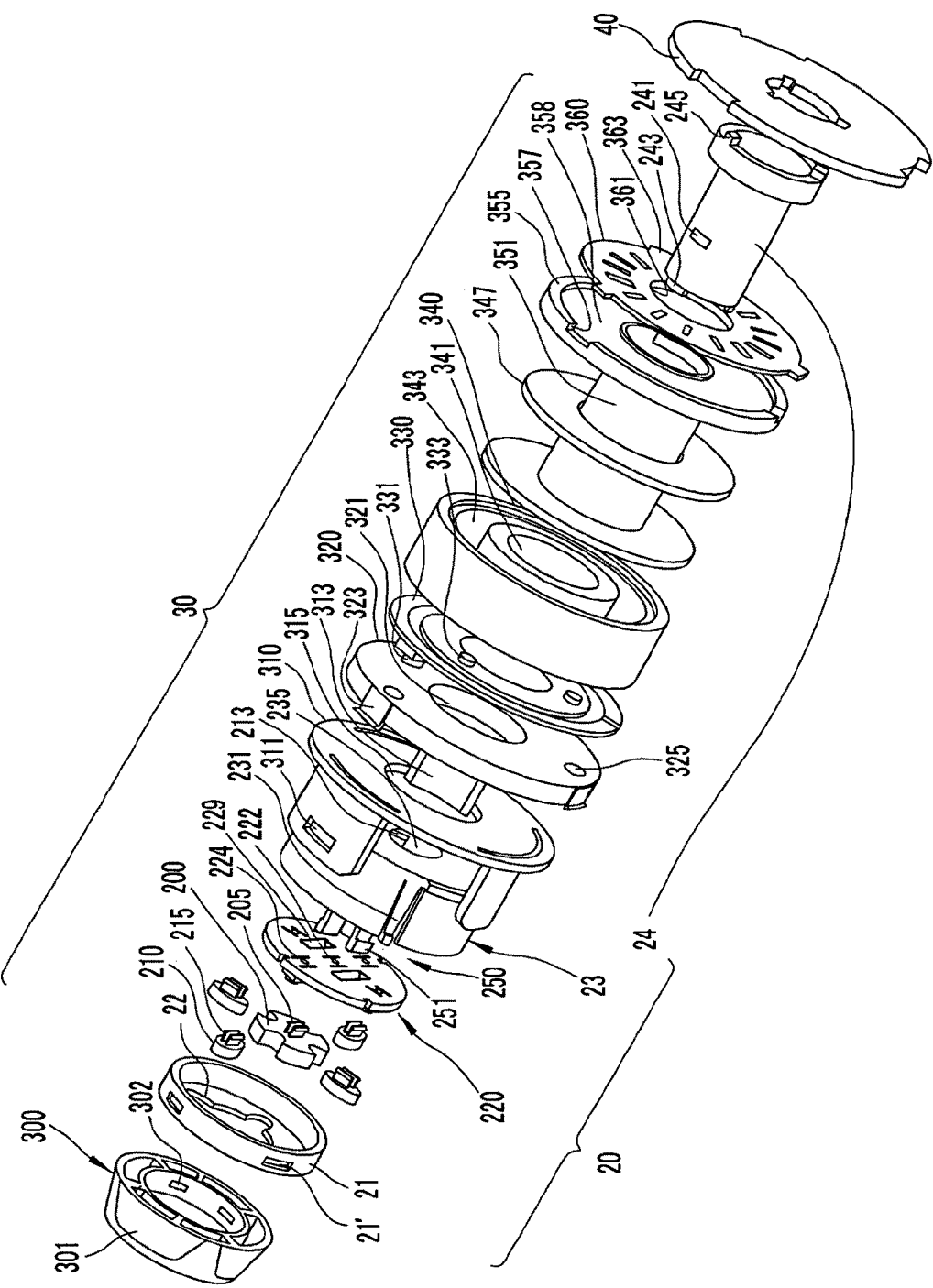
FIG. 8 is a schematic partial exploded perspective view showing the haptic actuator of FIG. 7 when viewed from another angle.

FIG. 7 is a schematic exploded perspective view showing a haptic actuator according to one embodiment of the present invention, and FIG. 8 is a schematic partial exploded perspective view showing the haptic actuator of FIG. 7 when viewed from another angle.

The haptic actuator 1 includes the housing 10, the rotary switch section 30 and the printed circuit board 40. At least part of the rotary switch section 30 and the printed circuit board 40 is disposed inside the housing 10; 11, 13, and a part of the rotary switch section 30 is disposed inside the housing 10 in such a fashion as to enable the axial rotation of the housing 10.

The haptic actuator 1 according to this embodiment is shown in the drawing in such a fashion that the housing 10 further includes a button switch section 20 at one end thereof, but may be constructed to include only the rotary switch section and the present invention is not limited thereto.

The housing 10 of the haptic actuator includes a housing body 11 and a housing base 13. The housing body 11 includes an internal space 115 defined therein so as to allow at least part of the rotary switch section 30 to be disposed therein. The housing body 11 is shown in the drawing in such a fashion as to be opened at both ends thereof. In this case, the housing base 13 is disposed at least one of the both ends of the housing body 11. The housing body 11 includes a base fastening portion 111 formed on an outer circumference of one end thereof and the housing base 13 includes a body fastening portion 130 formed on an outer circumference thereof to correspond to the base fastening portion 111. In this case, the base fastening portion 111 is constructed in the form of a through-hole formed on the outer circumference of one end thereof, and the body fastening portion 130 is constructed in the form of a protrusion formed on the outer circumference thereof, such that the base fastening portion 111 and the body fastening portion 130 can be engaged with each other. The present invention is not limited thereto, but various modifications cam be made such as a modification where the base fastening portion 111 may have a protrusion structure and the body fastening portion 130 may have a through-hole structure. In addition, the housing base 13 has an extended portion 131 formed on an end face thereof. The extended portion 131 is formed on the housing base 13 in such a fashion as to be inserted through the mounting hole 514 formed on the bottom surface of the accommodating portion 513 of the housing base 510 so that the haptic actuator 1 can be more stably mounted to the unit housing 50 and a manufacturer can easily grasp an assembling position to further facilitate an assembly process. In this case, although the extended portion has been described which includes a simple structure, various modifications of the extended portion can be made depending on a design specification such as a modification where a separate wire is penetratingly disposed in the extended portion so as to output a signal to the unit housing.

The rotary switch section 30 is constructed such that at least part thereof is positioned in the internal space defined by the housing 10. The rotary switch section 30 includes a rotary knob 300, a rotary plate 310, a rotary core 340 and a rotary suction portion 350. The rotary knob 300 is mounted at the other end of the housing body 11 in such a fashion as to be opposite to the housing base 13 and axially rotated. That is, the rotary knob 300 is disposed at an end of the housing body 11 in such a fashion as to be opposite to the housing base 13. The rotary knob 300 may have an extended portion formed on an outer circumference thereof in such a fashion as to vertically extend from one surface of a plate-type ring thereof and a plurality of extended protrusions formed between the extended portion and the plate-type ring so as to enhance a grip feeling to thereby prevent a slip which may occur during the manipulation of the rotary knob 300 by a user.

The rotary plate 310 is disposed at the inside of the housing body 11. The rotary plate 310 is engaged with the rotary knob 300 so that it is axially rotated together with the rotary knob 300. A plurality of engagement portions 311 is formed on a plurality of extended portions formed equidistantly circumferentially on one surface of the rotary plate 310 in such a fashion as to protrudingly extend from the one surface thereof toward the rotary knob 300, such that the rotary plate 310 can be engaged with the rotary knob 300. The rotary knob 300 has a plurality of mating engagement portions 302 formed on an inner surface thereof to correspond in position to the engagement portions 311 of the rotary plate 310 so that the rotary plate 310 and the rotary knob 300 are engaged with each other by means of the engagement portions 311 and the mating engagement portions 302. The engagement between the engagement portions 311 and the mating engagement portions 302 allows an axial rotation movement of the rotary knob 300 to be transferred to the rotary plate 310 to cause the rotary plate 310 to perform the axial rotation movement together with the rotary knob 300. A space is defined by the engagement between the rotary knob 300 and the rotary plate 310 so that a button switch section which will be described below may be partially accommodated therein.

The rotary core 340 is disposed between the rotary plate 310 and the housing base 13 so that the axial rotation of the haptic actuator is restricted. A core coil (not shown) is disposed inside the rotary core 340. That is, the rotary core 340 has a through-hole member 341 formed at the center thereof in such a fashion as to axially extend inside the rotary core and an accommodating portion 343 defined between the through-hole member 341 and an inner circumferential wall of the rotary core 340. The rotary core 340 is formed in a ring type having a " ⋀ ⊏ ⫽ " shape in a state of being laid down in cross-section. In this embodiment, the rotary core 340 is implemented to include the SNC material, but this implementation is merely exemplary. Various modifications of the rotary core 340 can be made in a range of enabling the generation of a magnetic interaction with a rotary disc of a rotary suction portion which will be described below such as being made of a ferromagnetic material and having a proper frictional coefficient.

A core coil (not shown) is disposed in the accommodating portion 343 defined in the rotary core 340. The coil may have a construction in which it is directly wound around the through-hole member 341, but may have a construction in which it is disposed through a bobbin 347 to enhance easiness of the assembly. The core coil is wound around a part of an outer circumference of the bobbin 347, and the through-hole member 341 to define the accommodating portion 343 of the rotary core 340 is insertedly received in a central through-hole formed at the center of the bobbin 347. According to the circumstances, an engagement member may be provided between an inner surface of the central through-hole of the bobbin 347 and an inner surface of the rotary core confronting the inner surface of the central through-hole of the bobbin so that it is engaged with the bobbin and the rotary core to thereby prevent the axial rotation of the bobbin.

The core coil has a structure in which it is wound relative to a central axis of the haptic actuator 1 including the rotary core 340. In this case, an explanation on the core coil is omitted for the sake of clarification of the engagement relationship of other constituent elements. It is noted that the shape of the core coil, etc., can be easily appreciated by a person skilled in the art.

In addition, it is possible to further include a construction for restricting the axial movement of the rotary core which will be described below or alleviating an impact due to the axial movement, if necessary.

That is, as shown in FIGS. 7 and 8, the haptic actuator 1 may have a construction in which a fixing plate 320 is further disposed between the rotary plate 310 and the rotary core 340, and a rotary elastic member 330 is further disposed between the fixing plate 320 and the rotary core 340. The fixing plate 320 is fixedly mounted inside the housing body 11 so that an area where the rotary plate 310 is disposed and an area where the rotary core 340 is disposed are separated from each other. The rotary elastic member 330 is disposed between the fixing plate 320 and the rotary core 340 so as to alleviate a drastical increase of an impact due to the axial linear movement of the rotary core 340.

The fixing plate 320 has a through-hole 321 formed at the center thereof, and engagement members 323 formed on an outer circumference thereof so that the engagement portions 323 are engaged with mating engagement portions 110 (see FIG. 7) formed on the housing body 11 to correspond to the engagement portions 323. That is, on the other end face of the housing body 11 where the rotary knob 300 is positioned is circumferentially formed an extended portion for supporting a stable rotation of the rotary knob 300, and the mating engagement portions 110 are formed on at least one surface of an inner side of the extended portion in such a fashion as to be oriented toward the fixing plate 320, so that the engagement portions 323 and the mating engagement portions 110 are engaged with each other. Thus, the fixing plate 320 is not rotated relative to the housing 10, particularly the housing body 110, but is fixed in position to thereby restrict the axial rotation thereof unlike the rotary knob 300 and the rotary plate 310 which are adapted to be axially rotated relative to the housing 10. Such positional fixation of the fixing plate 320 enables the separation of an area where the rotary plate 310 is positioned and an area where the rotary core 340 is positioned to thereby prevent movement interference between constituent elements which is likely to occur during the mutual movement between the rotary plate 310 and the the rotary core 340.

Besides, the rotary elastic member 330 is interposed between the fixing plate 320 and the rotary core 340. In this embodiment, the rotary elastic member 330 is constructed of a planar spider type elastic member. But, the present invention is not limited to such a planar spider type elastic member but may be constructed of a simple coil spring type elastic member. Various modifications of the rotary elastic member 330 can be made in a range of providing an elastic buffering function of reducing an impact due to the axial linear movement of the rotary core 340.

According to the circumstances, the rotary elastic member 330 of a planar spider-type has seating protrusions 331 and 333 formed on both surfaces thereof, respectively. Also, the fixing plate 320 and the rotary core 340 may have seating concave grooves 325 and 344 formed on one surfaces thereof, respectively, to correspond in position to the seating protrusions 331 and 333 of the rotary elastic member 330 so that the seating concave grooves 325 and 344 are engaged with the seating protrusions 331 and 333, respectively. Through such a construction, it is possible to prevent or reduce a damage caused by a fatigue and generation of a noise caused by the impact between other neighboring constituent elements and the rotary core 340 due to the axial linear movement of the rotary core 340 which will be described below.

The rotary suction portion 350 is at least partially disposed between the rotary core 340 and the housing base 13. The rotary suction portion 350 performs an axial linear motion relative to the rotary core 340 in response to an electrical signal being applied to the core coil (not shown) wound around an outer circumference of the bobbin 347 accommodated in the accommodating portion 343 formed inside the rotary core 340. Also, the rotary suction portion 350 is engaged with the rotary plate 310 so that it is axially rotated together with the rotary plate 310 when the rotary plate 310 is axially rotated. The rotary suction portion 350 is configured to include the rotary shaft 351 and the rotary disc 355. In this embodiment, while the rotary shaft 351 and the rotary disc 355 have been shown in the drawing in such a fashion as to be separated from each other, this is merely an exemplary embodiment for explaining the present invention and the rotary suction portion 350 may be constructed such that the rotary shaft 351 and the rotary disc 355 are formed integrally with each other.

The rotary shaft 351 has an outer diameter which is smaller than an inner diameter of the through-hole member 341 formed in the rotary core 340 so that the rotary shaft 351 can pass through the rotary core 340. The rotary disc 355 is fixedly mounted to one end of the rotary shaft 351 to thereby prevent a relative axial rotation movement from occurring between the rotary disc 355 and the rotary shaft 351. The rotary disc 355 has a mounting through-hole 356 formed at the center thereof and the rotary shaft 351 has a mating portion 353 formed at one end thereof to correspond to the mounting through-hole 356 of the rotary disc 355 so that the rotary disc 355 and the rotary shaft 351 are formed integrally with each other through the engagement between the mounting through-hole 356 and the mating portion 353.

The rotary suction portion 350 including the rotary shaft 351 and the rotary disc 355 is preferably made of a ferromagnetic material. For example, the rotary shaft 351 may be constructed of a stainless steel such as SUS, and the rotary disc 355 may be constructed of a ferromagnetic material such as an SNC material. Also, various modifications of the rotary suction portion 350 can be made in a range of enabling the generation of a magnetic interaction with the rotary core. The rotary disc 355 is preferably constructed of the same SNC material as that of which the rotary core is made so as to minimize abrasion caused by a friction occurring in the operating process of the haptic actuator which will be described below.

The rotary shaft 351 has an engagement portion 352 formed at the other end thereof in such a fashion as to be oriented toward the rotary plate 310. The engagement portion 352 abuts against a mating engagement portion 313 formed extendedly on one surface of the rotary plate 310 in such a fashion as to be oriented toward the housing base 13. Thus, the axial rotation of the rotary knob 300 is transferred to the rotary plate 310, and the rotation of the rotary plate 310 causes the rotary suction portion 350 to be axially rotated through the rotary shaft 351. A crossover area (see FIG. 10) is formed between the rotary disc 355 and the rotary core 340. That is, the crossover area is provided between the rotary disc 355 and the rotary core 340 so as to cause a mutual friction to occur between the rotary disc 355 and the rotary core 340 when the rotary shaft 351 of the rotary suction portion 350 is linearly moved in the axial direction by a magnetic force generated by an electrical signal being applied to the core coil (not shown) wound around an outer circumference of the bobbin 347 accommodated in the accommodating portion 343 formed inside the rotary core 340.

Like this, in case where the electrical signal being applied to the core coil becomes large to cause a magnetic force generated between the rotary core 340 and the rotary suction portion 350 to be increased, a vertical force between the crossover areas of an end of the rotary core 340 and the rotary disc 355 is increased, such that the magnitude of a frictional force generated between the crossover areas of the rotary core 340 and the rotary suction portion 350 is increased to cause a variation in a resistant force against the rotation force exerted to the rotary knob 300 by a user. Through this process, the user can feel various emotions upon the rotational manipulation of the rotary knob 300.

The printed circuit board 40 is disposed between the rotary suction portion 350 and the housing base 13. The printed circuit board 40 includes various electrical elements and a wire (not shown) for interconnecting the electrical elements so that the electrical signal applied to the core coil disposed inside the rotary core 340 can be transferred and/or controlled. The system control section 6 (see FIG. 22) of the sensation system is electrically connected with the haptic switching unit, more specifically, the printed circuit board so as to generate a control signal to control the haptic switching unit 5, more specifically, the haptic actuator and/or a capacitance type switch section 70 which will be described below. That is, the system control section 6 directly or indirectly establishes an electrical connection with a unit control section (not shown) which can be included in the printed circuit board of the haptic switching unit, and the printed circuit board of the haptic actuator and/or the haptic switching unit so as to transfer the control signal generated from the system control section 6 to the core coil of the haptic actuator or receive a sensing signal from a rotation sensing section 600 (see FIG. 7)) of the haptic actuator which will be described below. The printed circuit board 40 may be constructed such that it is fixedly mounted to the housing base 13, but in this embodiment the printed circuit board 40 may constructed in such a fashion as to be fixedly in position through another constituent element such as a button column 24 which will be described below. The construction of the printed circuit board 40 will be described hereinafter.

In the meantime, the haptic actuator 1 includes the rotation sensing section 600 (see FIGS. 7 and 8) for sensing the rotation of the rotary disc 355 of the rotary suction portion 350. The rotation sensing section 600 includes a rotary encoder plate 360 and an encoder sensor 403. The rotary encoder plate 360 is seated in a seating recess 358 formed on one surface of the rotary disc 355 in such a fashion as to be oriented toward the printed circuit board 40.

The rotation sensing section 600 further may include a constituent element for preventing the rotation of the rotary encoder plate 360, if necessary. That is, as shown in FIGS. 7 and 8, the rotary encoder plate 360 has a protrusion 363 formed protrudingly on an outer circumference thereof and the rotary disc 355 has a groove 357 formed on an outer circumference thereof to correspond in position to the protrusion 363 so as to allow the protrusion 363 to be accommodate therein. As shown in FIGS. 7 and 8, the protrusion 363 and the groove 357 may be provided in plural numbers, respectively. In case where the protrusion 363 and the groove 357 are provided in plural numbers, they are preferably arranged spaced apart from each other at equal angles. In this embodiment, the protrusion 363 is formed in a projection shape and the groove 357 is formed in a concave shape, but the protrusion 363 and the groove 357 may take a shape opposite to each other and may be provided in a single number but not in a plural number. In the present invention, various modifications of the protrusion 363 and the groove 357 can be made such as a modified construction in which they are formed on one surfaces the rotary encoder plate 360 and the rotary disc 355 confronting each other, but not on the outer circumferences of the rotary encoder plate 360 and the rotary disc 355.

The encoder sensor 403 is disposed on one surface of the printed circuit board 40 in such a fashion as to be oriented toward the rotary encoder plate 360. In this case, the encoder sensor 403 is constructed of an integral sensor including a light-receiving section and a light-emitting section, and the rotary encoder plate 360 is implemented to have a plurality of slots formed thereon correspondingly to the encoder sensor 403. However, the rotation sensing section of the present invention is not limited thereto but may be variously selected depending on a design specification. For example, a selective modification of the light-receiving section and the light-emitting section of the rotation sensing section is possible including an implementation of the encoder sensor having the light-receiving section and the light-emitting section formed separately from each other.

The operation process of the haptic actuator including the rotary switch section is as follows.

First, the operation state of the rotary core and the rotary suction portion included in the rotary switch section will be described hereinafter.

Figure 9:
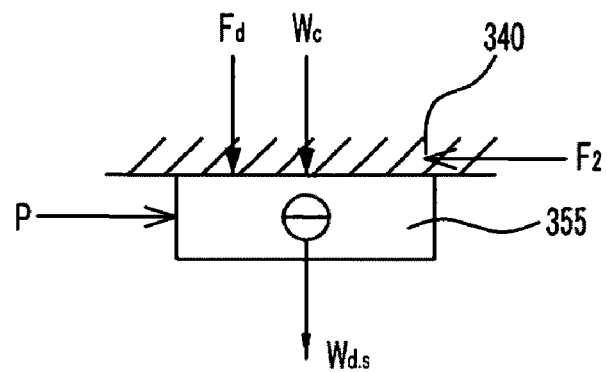
FIG. 9 is a schematic view showing a free body diagram (FBD) for depicting the relevant forces acting on one surface of a rotary disc of the present invention.
Figure 10:
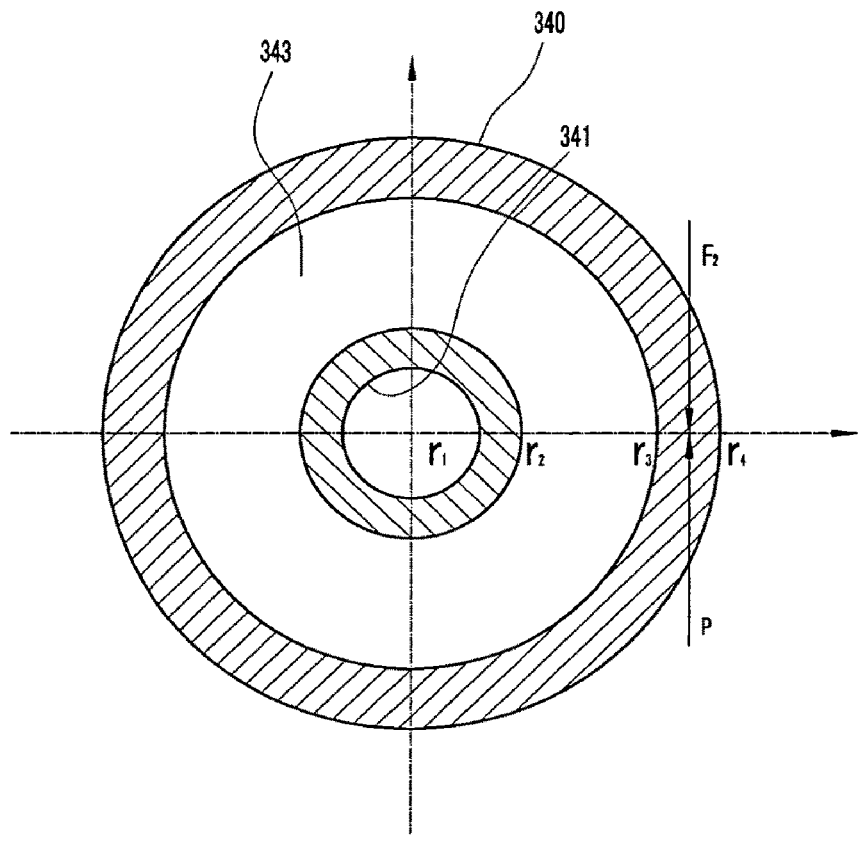
FIG. 10 is a schematic view showing a state of the contact surface between a rotary core and a rotary suction portion of the present invention.

FIG. 9 is a schematic view showing a free body diagram (FBD) for depicting the relevant forces acting on one surface of a rotary disc of the present invention, and FIG. 10 is a schematic view showing a state of the contact surface between a rotary core and a rotary suction portion of the present invention.

The axial rotation of rotary core 340 to be transferred to the fixing plate 320 is restricted through the rotary elastic member 330, and a rotational force caused by a torque exerted by a user is transferred to the rotary shaft 351 through the rotary knob 300 via the rotary plate 310. In case where current is applied to the core coil accommodated in the rotary core 340, the rotary disc 355 engaged with the rotary shaft 351 comes into close contact with the end of the rotary core 340 by means of a magnetic suction force generated by the applied current so as to cause a frictional force due to the magnetic suction force to be generated from a contact surface between the rotary disc 355 and the rotary core 340 in an opposite direction to that of an action force by a user.

In FIG. 9, Wds denotes gravity of the rotary disc 355, Wc denotes gravity of the rotary core 340, P denotes an action force caused by a torque exerted by the user, Fd denotes a magnetic suction force caused by the current applied to the core coil, and F2 denotes a frictional force generated from the contact surface between the rotary core 340 and the rotary disc 355. In this case, F2 has a value of less than P and is expressed as follows:

$$F_2 = \mu_s(F_d + W_c - W_{d,s})$$

where μs denotes a coefficient of maximum stationary friction between the contact surface between the rotary core and the rotary disc. A mathematic model including a dynamic friction coefficient may be selected so as to perform a more precise analysis, if necessary, but in this embodiment a simplified mathematic model is adopted for the sake of clarification of explanation of the analysis.

As shown in FIG. 10, a resultant torque produced from F2 and P is expressed as follows. The resultant torque T is exerted by a user and is obtained by subtracting a frictional force between the rotary core and the rotary disc from an acting torque caused by the action force P.

$$T \simeq (P - F_2)r_0 \simeq (P - F_2)\left[\left(\frac{r_1 + r_2}{2}\right) + \left(\frac{r_3 + r_4}{2}\right)\right]$$

where it is assumed that r0 denotes an effective radius for an area where a frictional force between an end of the rotary core and the rotary disc is generated, P and F2 denote a concentrated load applied to the area where the frictional force between the rotary core and the rotary disc is generated. This is intended to facilitate an explanation on the mechanical relationship between the constituent elements of the present invention, and the present invention is not limited thereto such as a selection of a modeling for more precise calculation.

Figure 11:
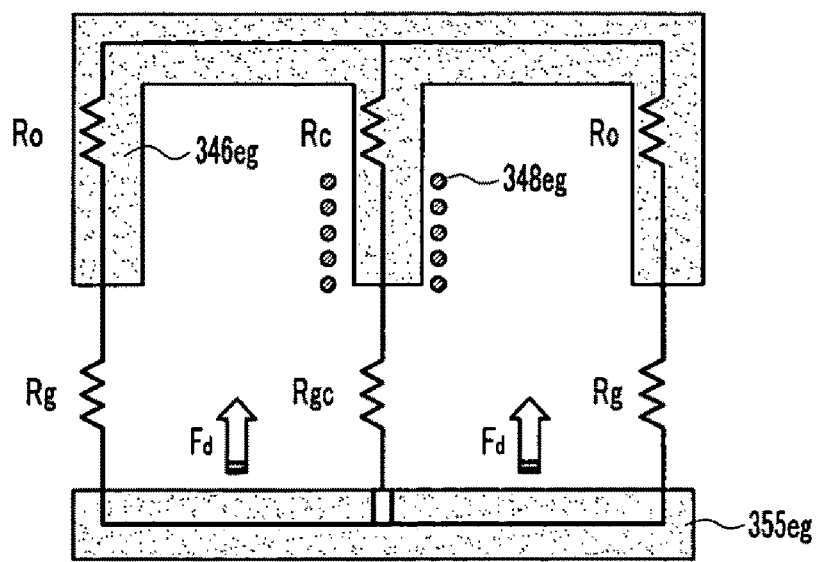
FIG. 11 is a schematic view showing equivalent models for a magnetic circuit among a rotary core, a core coil and a rotary disc.
Figure 12:
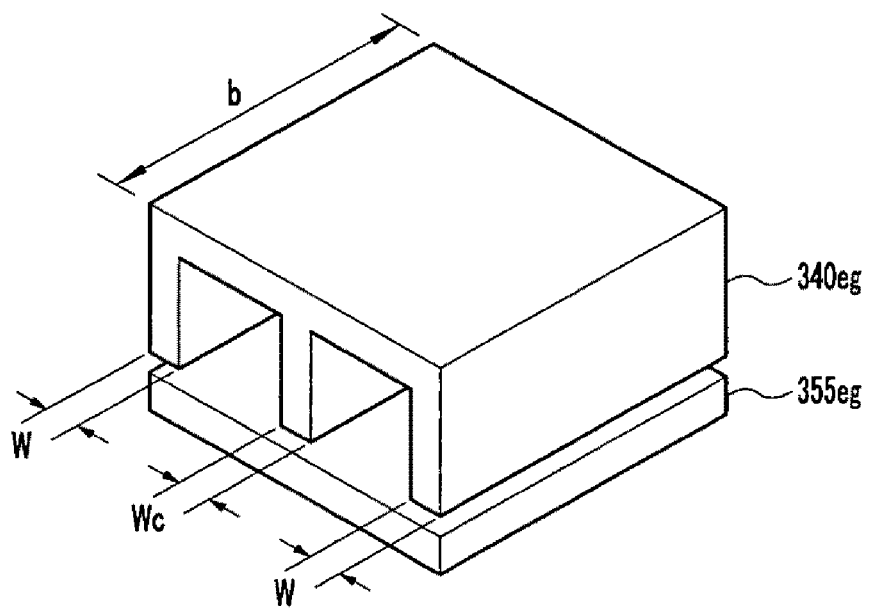
FIG. 12 is a schematic perspective view showing the equivalent models of FIG. 7.

In the meantime, FIG. 11 is a schematic view showing a magnetic circuit of equivalent models 340eq, 346eq, 348eq and 355eq for facilitating an explanation on a magnetic circuit among a rotary core, a core coil and a rotary disc, and FIG. 12 is a schematic perspective view showing the equivalent models of FIG. 7.

The ring-type rotary core can be replaced by a square-type equivalent model having an extended portion 346eq extending in a direction vertical to the rotary disc. In this case, Rc denotes a magnetic resistance for the vertically extended portion around which the core coil is wound, Ro denotes a magnetic resistance for the vertically extended portion around which the core coil 348eq is not wound, Rgc denotes a magnetic resistance for a clearance between the vertically extended portion around which the core coil 348eq is wound and the rotary disc 355eq, Rg denotes a magnetic resistance between the vertically extended portion around which the core coil 348eq is not wound and the rotary disc 355eq, b denotes a length of the equivalent model, and w denotes a width of the vertically extended portion of the equivalent model.

A crossover area between the vertically extended portion 346eq and the rotary disc 355eq of the equivalent model, i.e., an area at the clearance is identical to a crossover area between the end of the rotary core 340 and the rotary disc 355.

$$A = \int_{r_3}^{r_4} 2\pi r dr + \int_{r_1}^{r_2} 2\pi r dr = \pi(r_4^2 - r_3^2) + \pi(r_2^2 - r_1^2)$$

$$A_{eq} = b(w_c + 2w)$$

$$A_{eq} = A$$

In the equivalent circuit of FIG. 1, the magnetic resistance Rm for the equivalent model is expressed as follows:

$$\frac{1}{R_m} = \frac{2}{(R_0 + R_g)} + \frac{1}{(R_c + R_{gc})} = \frac{2(R_c + R_{gc}) + (R_o + R_g)}{(R_c + R_{gc})(R_o + R_g)}$$

$$R_m = \frac{(R_c + R_{gc})(R_o + R_g)}{2(R_c + R_{gc}) + (R_o + R_g)}$$

The magnetic flux generated by the equivalent model is expressed as follows:

$$\phi = \frac{N \cdot I}{R_m} = B_g \cdot A_{eq}$$

Where N denotes the number of winding turns of the core coil wound around the vertically extended portion, I denotes current applied to the core coil, and Bg denotes a magnetic flux density of the clearance.

$$F_d = \frac{B_g^2 \cdot A_{eq}}{2\mu_0} = \frac{\phi^2}{2\mu_0 A_{eq}} = \left(\frac{N}{R_m}\right)^2 \frac{1}{2\mu_0 A_{eq}} I^2$$

Where μ0 denotes vacuum permeability, F denotes a magnetic suction force between the rotary core and the rotary disc. In this case, Fd can be expressed by the current I.

Figure 13:
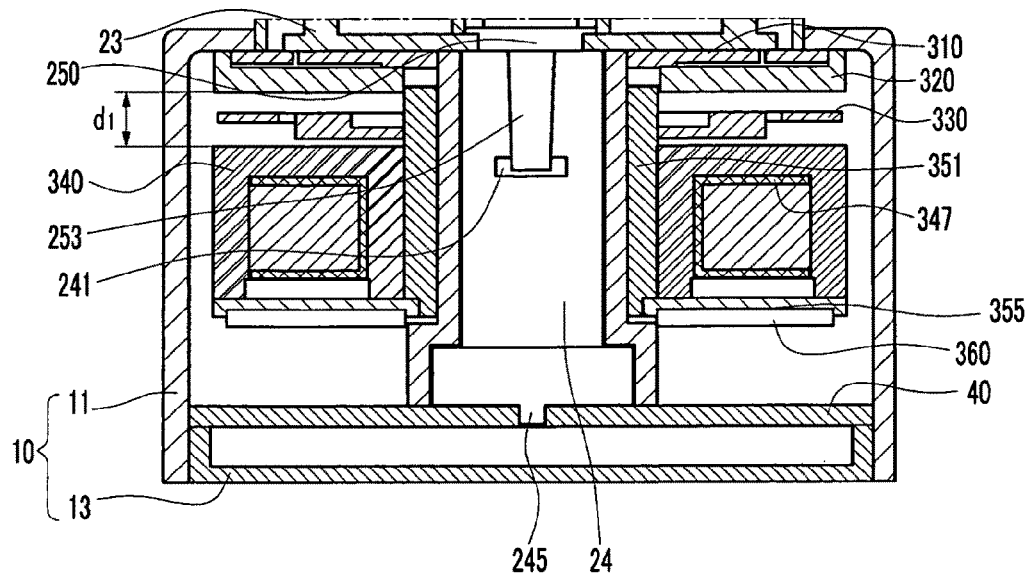
FIG. 13 is a schematic cross-sectional view showing a state before the haptic actuator is operated according to one embodiment of the present invention.
Figure 14:
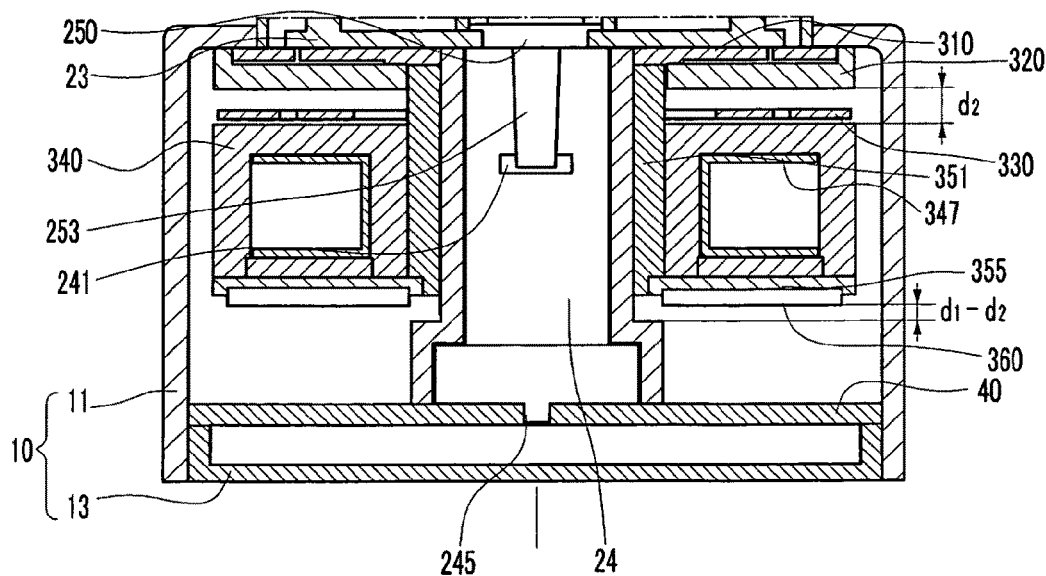
FIG. 14 is a schematic cross-sectional view showing a state in which the haptic actuator is operated according to one embodiment of the present invention.

FIG. 13 is a schematic cross-sectional view showing the haptic actuator before the current I is applied to core coil according to one embodiment of the present invention, and FIG. 14 is a schematic cross-sectional view showing the haptic actuator after the current I is applied to core coil according to one embodiment of the present invention.

As shown in FIG. 13, a contact is established between the end of the rotary core 340 and the crossover area of the rotary disc 355 by the weight of the rotary core itself, but a magnetic suction force caused by the current does not act between the end of the rotary core 340 and the crossover area of the rotary disc 355, such that a considerable clearance d1 exists between the rotary core 340 and the fixing plate 320. On the other hand, as shown in FIG. 14, when the current I is applied to the core coil, a considerable force caused by the magnetic suction force acts between the end of the rotary core 340 and the crossover area of the rotary disc 355 to cause an elastic deformation to be applied to the rotary elastic member 330 interposed between the rotary core 340 and the fixing plate 320, such that a small clearance d2 exists between the rotary core 340 and the fixing plate 320. Thus, the clearances d1 and d2 between the fixing plate 320 and the rotary core 340 before and after the current I is applied to the core coil satisfies the following relationship:

$$d_1 \gg d_2$$

Thus, in case where the current I is applied to the core coil and an action force P for generating a torque from the rotary knob by a user is exerted, F2 and T are expressed as follows:

$$F_2 = \mu_s\left[\left(\frac{N}{R_m}\right)^2 \frac{1}{2\mu_0 A_{eq}} I^2 + W_c - W_{d,s}\right]$$

$$T = \left[P - \mu_s\left\{\left(\frac{N}{R_m}\right)^2 \frac{1}{2\mu_0 A_{eq}} I^2 + W_c - W_{d,s}\right\}\right]\left[\left(\frac{r_1 + r_2}{2}\right) + \left(\frac{r_3 + r_4}{2}\right)\right]$$

The current I is applied to the core coil depending on a selected one among the patterns preset and stored in the storage section of the haptic actuator. Thus, the user can sense a resistant force of a preset pattern by a force F2 acting in an opposite direction to that of the action force exerted by the user.

In the meantime, the haptic actuator according to the present invention may be operated in a vibration mode besides the above-mentioned rotation mode. In other words, the user does not exert the action force P for generating the torque through the rotary knob, but periodic or non-periodic action of the magnetic suction force is possible according to a variation of the current I applied to the core coil depending on only the preset patterns (the magnitude and application period of current) stored in the storage section which will be described below, such that the axial vibration of the haptic actuator can occur. Thus, the user can sense a vibration based on a vibration mode through the rotary knob or the unit housing.

The analysis of the operation of the haptic actuator in the rotation mode and the vibration mode is carried out under a simplified certain condition for the sake of easiness of explanation, but the present invention is not limited thereto. That is, the above embodiment illustrates the state of a force for the haptic actuator which is arranged vertically and used in a rotation (torque) mode. In case where the haptic actuator is operated in a state where its axis is arranged parallel with the ground surface, Wc and Wds can be removed and a torque is not generated by a user. In case where the haptic actuator is operated in a vibration mode due to the magnetic suction force applied to the core coil, P and F2 may be eliminated, or a more precise mathematic model for a force between the rotary core and the rotary disc and a more precise equivalent model for a magnetic circuit through a finite element method (REM) may be selected, etc., if necessary. Like this, various analyses can be performed in a range including the construction of the present invention.

Also, on the other hand, the haptic actuator according to one embodiment of the present invention may further include anther switch section besides the rotary switch section.

As shown in FIGS. 1 to 4, FIGS. 7 and 8, the housing 10 of the haptic actuator 1 may further include a button switch section 20. The button switch section 20 is operated by a depression operation in an axial direction or a direction oblique relative to the axis of the housing unlike the operation of the rotary switch section enabling achievement of a switching operation by the axial rotation movement of the haptic actuator 1 or a switching control.

The button switch section 20 is disposed to prevent or restrict the axial rotation of the housing 10. The button switch section 20 includes an enter switch knob 200, a directional switch knob 210 and a button printed circuit board 220. The button switch section 20 may further include a button cover 21 and a button base 23 for defining a space for seatedly accommodating the enter switch knob 200, the directional switch knob 210 and the button printed circuit board 220. Also, the button switch section 20 may further include a button column 24 for interconnecting the button cover 21, the button base 23 and the printed circuit board 40 so as to prevent a relative rotation movement therebetween. In this embodiment, the case where the button switch section 20 includes all of the above constituent elements will be described below.

The button cover 21 and the button base 23 are disposed inwardly radially from an axial center of the rotary knob 300 and the housing body 11. The button cover 21 has a fastening portion 21' formed on an outer circumference thereof, and the button base 23 has a mating fastening portion 231 formed on an outer circumference thereof to correspond in position to the fastening portion 21' so that the mating fastening portion 231 is separately engaged with the fastening portion 21'.

The button cover 21 has a through-hole formed therein so as to allow the directional switch knob 210 and the enter switch knob 200 to be seated therein.

The button column 24 is further provided between the rotary plate 310 and the printed circuit board 40 in such a fashion as to pass through the center of the fixing plate 320, the rotary elastic member 330, the rotary core 340 and the rotary disc 350, such that a stable axial movement of the rotary suction portion including the rotary shaft and the rotary disc can be guided.

Meanwhile, the button column 24 may have a mounting protrusion 245 formed on an end face thereof in such a fashion as to be oriented toward the housing base (see FIGS. 7 and 8) so as to engage with a mounting groove 401 formed at the central hole of the printed circuit board 40. The button column 24 has a mating engagement portion 241 formed on an outer circumference thereof so as to be engaged with an engagement portion 253 of the button fixing portion 250. In this case, it can be apparently understood that the engagement portion 253 is formed in a convex protrusion shape and the mating engagement portion 241 is formed in a concave groove shape, but the construction of the engagement portion 253 and the mating engagement portion 241 may be formed in an opposite manner to the above construction. Also, the button column 24 has a protrusion 243 formed at the other end face thereof in such a fashion as to be oriented toward the rotary knob 300, if necessary. In this case, the protrusion 243 may be constructed to be engaged with an end of the button fixing portion 250. The button fixing portion 250 has a pair of button fixing protrusion 251 formed at an end thereof so as to be engaged with a pair of through-holes 229 formed in the button printed circuit board 220 to thereby prevent the button printed circuit board 220 from being rotated relative to the central axis thereof.

In this case, the directional switch knob 210 is provided in plural numbers. Each directional switch knob 210 may be disposed at a predetermined position so as to be implemented as a switch knob enabling selection of a direction for the operation of the haptic actuator.

As shown in FIGS. 7 and 8, the directional switch knobs 210 are preferably disposed at equal angles on a cocentric line with respect to the center of the enter switch knob 200. In this embodiment, the directional switch knobs 210 are disposed equidistantly at 90 degrees with respect to each other so that a total of four directional switches are disposed. This is merely exemplary embodiment and the button switch section according to the present invention is not intended to limit the number of the above directional switch knobs to four. In addition, the enter switch knob 200 is disposed at the center of the directional switch knobs 210.

The button printed circuit board 220 is disposed at the inside of the housing body 11. More specifically, the button printed circuit board 220 is disposed inside an inner space defined by the engagement between the button cover 21 and the button base 23 disposed inside an inner space defined by the rotary knob 300 and the housing body 11. The button printed circuit board 220 may be fixedly mounted to the button base 23 by means of a separate element, if necessary.

Each of the directional switch knobs 210 has a engagement member 215 formed on one surface thereof in such a fashion as to be oriented toward the housing base 13, and the enter switch knob 200 has an engagement member formed on one surface thereof, and the button printed circuit board 220 has a plurality of engagement slits 224 and an engagement slit 222 formed therein so as to allow the engagement members 205 and 215 to be inserted thereto. In this case, the ends of the engagement member 205 the engagement members 215 are formed in a protrusion shape so as to prevent the engagement member 205 and the engagement members 215 from separately escaping from the engagement slit 222 and the engagement slits 224 accidently. In this case, although not shown clearly, the button printed circuit board 220 may be constructed to be fixedly mounted to the button column 24 in order to prevent the button printed circuit board 220 from being rotated relative to the axial direction of the haptic actuator 10.

The button printed circuit board 220 includes a plurality of button switches mounted on one surface thereof in such a fashion as to be oriented toward the enter switch knob 200 and the directional switch knob 210. The button switches include an enter switch 221 abutting against an enter switch column (not shown) included in the enter switch knob and a plurality of directional switches 225 abutting against a plurality of directional switch columns (not shown) included in a plurality of directional switch knobs 210. Similarly to the arrangement construction of the enter switch knob and the directional switch knobs, the enter switch 221 is disposed at the center of the button printed circuit board 220 and the directional switches 225 are disposed at equal angles on a concentric line with respect to the center of the button printed circuit board 220, i.e., the enter switch. In this embodiment, the directional switches 225 are disposed equidistantly at 90 degrees with respect to each other so that a total of four directional switches are disposed cocentrically with each other. In this embodiment, although the enter switch 221 and the directional switches 225 are constructed of a contact switch, the present invention is not limited thereto but various modifications thereof such as being constructed of a metal dome switch can be made in a range of including a contact switch function of determining whether or not an ON/OFF signal is generated by a depression force.

In this case, although not shown in the drawing in more detail, the button printed circuit board 220 further includes a separate light source such as an LED in which power is controlled depending on the operation state of the enter switch 221 and the directional switches 225 implemented as a contact switch. Various modifications of the enter switch knob 200 and the directional switch knobs 210 can be made such as further including a light display section (not shown) formed through a process such as a laser etching so as to allow light generated from a light source such as the LED to exit to the outside therethrough.

The capacitance type switch section 70 includes a capacitance type switch button 71 and a capacitance type switch electrode 73. The capacitance type switch button 71 is disposed at the unit housing 50, more specifically, at the housing body 500, and the capacitance type switch electrode 73 is disposed at the printed circuit board 60. In this embodiment, one end of the capacitance type switch button 71 is fixedly mounted to the unit housing 50, more specifically, to housing body 500 and the other end thereof is formed as a free end. The capacitance type switch buttons 71 are formed with a free end in such a fashion as to be alternately arranged with each other. That is, a button gap 503 (see FIG. 5) is defined between a portion formed as a free end of the capacitance type switch button 71 and the housing body 500. The button gap 503 is arranged circumferentially around the through-hole 502 formed at the center of the housing body 500 in such a fashion as to be formed in a zigzag manner so that free ends of two neighboring capacitance type switch buttons 71 are disposed to be oriented in an opposite direction with respect to each other.

Figure 5:
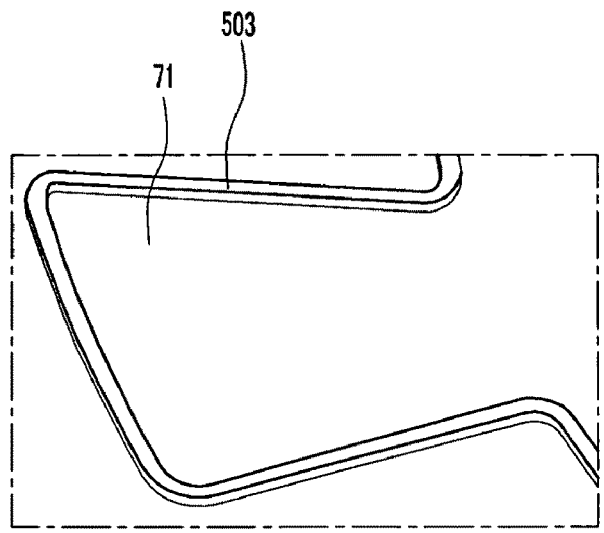
FIG. 5 is a schematic partial enlarged perspective view showing a housing body of the haptic switching unit.
Figure 6:
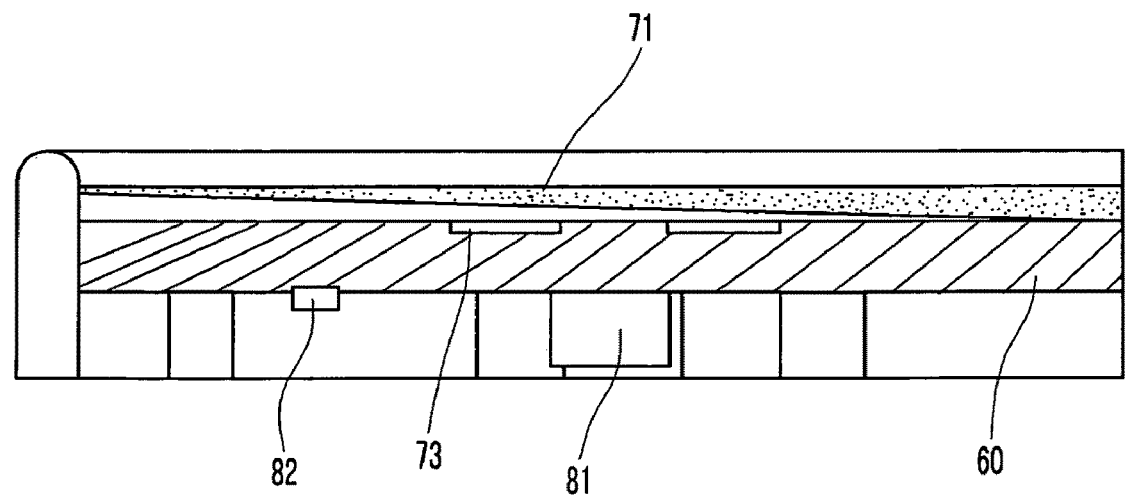
FIG. 6 is a schematic partial cross-sectional view showing the operating process of a capacitance type switch section of the haptic switching unit according to one embodiment of the present invention.

As shown in FIGS. 5 and 6, the capacitance type switch electrodes 73 are circumferentially arranged on the printed circuit board 60 in such a fashion as to confront the capacitance type switch button 71. The capacitance type switch electrodes 73 is positioned spaced apart from the capacitance type switch buttons 71 to correspond in position to the capacitance type switch buttons 71 when an external force is not applied to the capacitance type switch button 71. The capacitance type switch buttons 71 is chamfered so that one end as a free end of the capacitance type switch button 71 has a thickness smaller than that of the other end of the capacitance type switch button 71 which is integrally formed with the housing body 500. The one end of the the capacitance type switch button 71 is formed as the free end of a chamfered structure so that the capacitance type switch button 71 can have a sufficient restoring force enabling it to return to its original position in spite of the repeated operation thereof. When the user presses the capacitance type switch button 71 with his or her fingers, one end of the capacitance type switch button 71 is moved downwardly toward the printed circuit board 60, and then abuts against a corresponding capacitance type switch electrode 73 disposed on the printed circuit board 60 to result in a variation of a capacitance value so as to operate a corresponding capacitance type switch section.

The sensation system 2 according to one embodiment of the present invention includes a light-emitting section 80. The light-emitting section 80 is electrically connected with the system control section 6 (see FIG. 22), and emits light corresponding to each operation of the haptic switching unit 5 in response to the control signal generated from the system control section 6 in cooperation with the haptic switching unit 5. The light-emitting section 80 includes a plurality of light-emitting sources 81, 82 and 87 and a system optical unit. The light-emitting sources 81, 82 and 87 emit light in response to the control signal of the system control section 6, and the system optical unit includes an optical element such as a prism, a light guide part, etc. In this embodiment, the system optical unit is implemented as system prisms 83 and 86. The prisms 83 and 86 are disposed adjacent to the light-emitting sources 81, 82 and 87 to cause light emitted from the light-emitting sources 81, 82 and 87 to exit to the outside.

The light-emitting sources 81, 82 and 87 may be implemented as a plurality of self-light sources such as LEDs. The light-emitting sources 81, 82 and 87 may be composed of LEDs having the same color but may be composed of LEDs having a plurality of colors such as red color, blue color and white color. If more than three colors are required under the circumstances, the light-emitting sources may further include a separate color filter to allow light having predetermined colors to exit to the outside.

Figure 19:
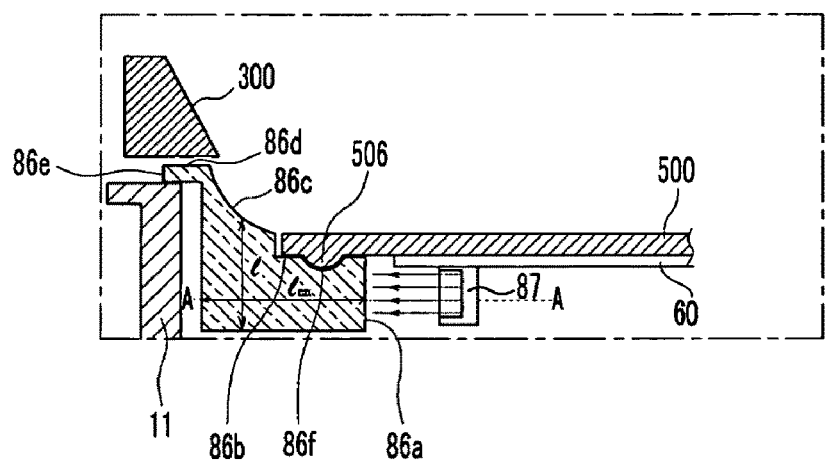
FIG. 19 is a schematic partial cross-sectional view showing an area where a light-emitting section of a sensation system is disposed according to one embodiment of the present invention.

As shown in FIGS. 3 and 4, the system prism of the light-emitting section 80 according to the present invention includes a ring-type system prism 86 and a line-type system prism 83. The ring-type system prism 86 has a through-hole 86e formed at the center thereof so as to allow an upper end of the haptic actuator 1 to pass therethrough and exposed to the outside through the through-hole 502 of housing body 500. In FIG. 19, there is shown FIG. 19 is a schematic partial cross-sectional view showing an area of the light-emitting section including the ring-type system prism 86. The lower end of the ring-type system prism 86 is disposed inside the housing body 500. The ring-type system prism 86 has a supporting extension portion 86d formed on a top end thereof and a contact end 86b formed on one surface of a lower end thereof. The supporting extension portion 86d comes in close contact with a top end of the housing body 11 and the contact end 86b comes in close contact with an inner lower surface of the housing body 500 to support the ring-type system prism. The ring-type system prism 86 includes a light incident surface 86a formed on the lower end thereof and a light exit surface 86c formed on the top end thereof. The light incident surface 86a and the light exit surface 86c are constructed to be alternately arranged with each other.

A light-emitting source 87 provided in the proximity of the ring-type system prism 86. The light-emitting source 87 may be implemented as a light-emitting source of a lateral irradiation type such as a side view LED such that a plurality of light-emitting sources are arranged around an outer circumference of the ring-type system prism 86. The light-emitting source 87 is disposed on a line having a maximum penetrating length of the ring-type system prism 86. That is, as shown in FIG. 19, the ring-type system prism 86 has various prism penetrating lengths (l) and a maximum prism penetrating length (lmax) has a maximum value among other prism penetrating lengths (l). In this case, the prism penetrating length refers to a length on a linear line on which light penetrates through the ring-type system prism 86. Light emitted from the light-emitting source 87 is incident to the ring-type system prism 86 through a light incident surface 86a perpendicular to the incident light, and then exits to the outside from the light exit surface 86c. Such an optical structure increases an optical path inside the ring-type system prism so that light which is emitted from the light-emitting source 87 and is incident to the ring-type system prism can be more smoothly dispersed.

In addition, the ring-type system prism 86 has a mounting portion 86f formed on one surface thereof, and the housing body 500 has a mating mounting portion 506 formed on the inner underside thereof to correspond in position to the mounting portion 86f so as to be engaged with the mounting portion 86f. That is, as shown in FIG. 19, the ring-type system prism 86 has the mounting portion 86f formed on one surface of the contact end 86b in such a fashion as to be oriented toward the inner surface of the housing body 50, and the housing body 50 has the mating mounting portion 506 formed on the inner underside thereof to correspond in position to the mounting portion 86f. In this case, the mounting portion 86f is formed in a concave groove shape, and the mating mounting portion 506 is formed in a convex protrusion shape. But, various modifications of the mounting portion 86f and the mating mounting portion 506 can be made such as being formed in an opposite shape to each other in a range of having a structure in which they are in close contact with each other The system prism of the light-emitting section 80 may further include a line-type system prism, if necessary. The line-type system prism 83 is disposed at the inside of the unit housing 50, more specifically, in an inner space defined by housing body 500 and the housing base 510 which are joined to each other so as to transfer light to the capacitance type switch section 70 to cause a user to more easily grasp a proper operational position of the capacitance type switch section 70. The light-emitting section 80 includes the light-emitting sources 81 and 82 and the line-type system prism 83. The light-emitting sources 81 and 82 may be implemented as light-emitting source such as the LED, and are disposed on the printed circuit board 60.

Whether or not the light-emitting sources 81 and 82 is operated is determined based on an electrical signal generated from the system control section 6 included in the sensation system. The light-emitting source denoted by reference numerals 81 and 82 may be constructed to perform the same operation as that of the light-emitting source denoted by reference numeral 87.

Various modifications of the light-emitting source can be made depending on a design specification such as including a construction of performing an individual operation, if necessary.

Figure 21:
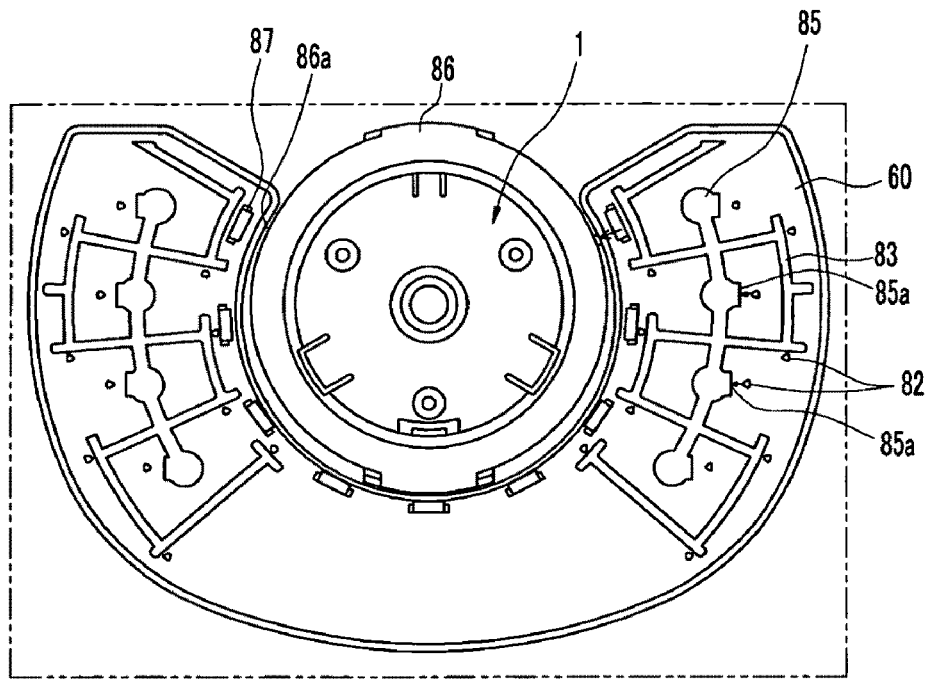
FIG. 21 is a schematic partial bottom view showing a printed circuit board of the haptic switching unit according to one embodiment of the present invention.

In this embodiment, the light-emitting sources 81 and 82 are disposed on the underside of the printed circuit board 60. The light-emitting sources 81 and 82 include central lamp 81 disposed at the center of the capacitance type switch electrode 73 and a side lamp 82 disposed in the proximity of the capacitance type switch electrode 73. The central lamp 81 composed of a top LED type has a construction in which light is irradiated downwardly from the top of the line-type system prism 83, and the side lamp 82 has a construction in which light is irradiated from the side of the line-type system prism 83. In this embodiment, the light-emitting sources 81 and 82 are described and illustrated which includes all of two types, but various modifications of the light-emitting sources 81 and 82 can be made depending on a design specification such as selectively including any one of the two types or including all of the two types, if necessary. The line-type system prism 83 is disposed between the housing base 510 and the printed circuit board 60 constituting the unit housing 50 in such a fashion as to be adjacent to the central lamp 81. That is, the housing base 510 has an accommodating portion 511 formed therein so as to allow the line-type system prism 83 to be received therein. The accommodating portion 511 has a seating part 512 protrudingly formed on the inner wall thereof so as to allow the printed circuit board 60 to be stably seated thereon, so that the line-type system prism 83 is positioned between the printed circuit board 60 and the housing base 510. Thus, the line-type system prism 83 permits light emitted from the light-emitting source 81 to exit to a part of the line-type system prism 83, i.e., the top surface thereof. The line-type system prism may be implemented with a zigzag pattern, and if necessary, may have an extended portion 85 extending from a body of the zigzag type prism in order to increase an optical path introducing from the light-emitting sources 81 and 82. Also, the line-type system prism may be constructed such that the side lamp 82 is disposed on a line having a maximum prism penetrating length of the line-type system prism 83 in order for light emitted from the light-emitting sources 81 and 82 to be more easily incident and transferred to the line-type system prism 83. As shown in FIG. 21, the side lamp 82 is provided in plural numbers in such a fashion as to be arranged at each linear portion of the zigzag type prism body so as to secure a maximum optical path length. Also, the extended portion 85 includes an incident surface 85a perpendicular to a direction where light is incoming thereto from the light-emitting source 82 so as to facilitate introduction of light thereto from the light-emitting source 82.

The printed circuit board 60 has a penetrating gap 61 formed therein to corresponding in position to the line-type system prism 83. Thus, light emitted from the light-emitting sources 81 and 82 by the operation of the light-emitting sources 81 and 82 is concentrated to the line-type system prism 83, and exits to the outside through the top end of the line-type system prism 83. Then, the exit light in turns exits to the outside through the penetrating gap 61 of the printed circuit board 60 and the button gap 503 of the housing body 500. Thus, a user can more definitely recognizes a boundary between the plurality of capacitance type switch buttons 71 arranged circumferentially around the haptic actuator 1. In addition, the light-emitting section generates and emits light corresponding to an operation of the haptic switching unit including the haptic actuator and/or the capacitance type switch section in response to the control signal generated from the system control section to cause the user to more easily grasp the operation state of the haptic switching unit. Under any circumstances, the capacitance type switch button may be constructed such that a predetermined button display section (not shown) that is formed of a thin film type through a machining process such as a laser etching and is disposed at the circumference of the capacitance type switch button for allowing light to exit therethrough besides the construction in which one end thereof is formed as a free end and the button gap is formed.

Also, on the other hand, the light-emitting section may be disposed at constituent element of other type. In other words, in the above embodiment, although the light-emitting section has been described with respect to a construction in which it is disposed at the haptic switching unit, it may be constructed to be included in the display unit. That is, the display unit 3 is disposed at the system housing 4 and is electrically connected with the haptic switching unit 5 so as to display the operation state of the haptic switching unit 5.

Figure 20:
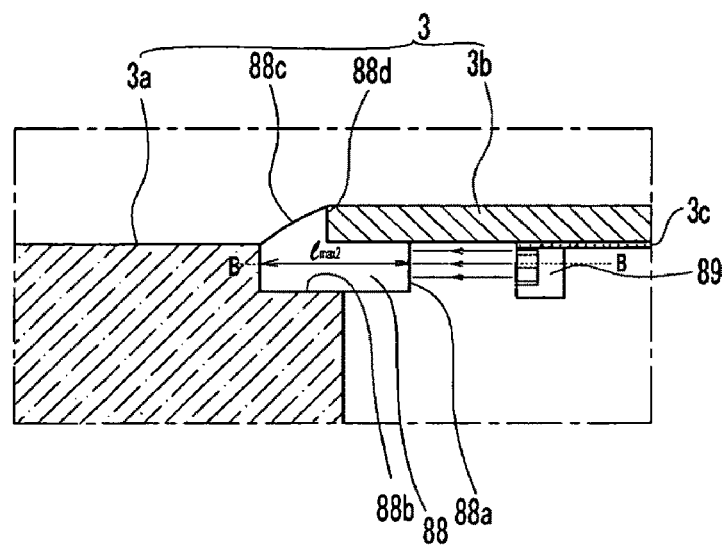
FIG. 20 is a schematic partial cross-sectional view showing another example of a light-emitting section of a sensation system according to one embodiment of the present invention.

FIG. 20 is a schematic partial cross-sectional view showing another example of a light-emitting section of a sensation system according to one embodiment of the present invention.

Referring to FIG. 20, the display unit 3 includes a display panel 3a a display housing 3b. The display panel 3a is mounted to the display housing 3b in such a fashion that an image area is exposed to the outside. A rectangular type system prism 88 is disposed between the display panel 3a and the display housing 3b. The rectangular type system prism 88 has a first mounting end portion 88d formed on a top end thereof so as to allow the display housing to be mounted thereon and a second mounting end portion 88b formed on a bottom end thereof so as to be mounted on an edge of the display panel. Thus, the rectangular type system prism 88 is constructed such that it is supportedly disposed between the display housing 3b and the display panel 3a. Although not shown in the drawing, various modifications of the rectangular type system prism 88 can be made depending on a design specification such as a modified construction in which a separate constituent element for supporting the rectangular type system prism 88 is further included. The rectangular type system prism 88 has a rectangular incident surface 88a formed at one side thereof in such a fashion as to be positioned at the inside of the display housing 3b. Also, the rectangular type system prism 88 has a rectangular exit surface 88c formed at the other side thereof in such a fashion as to be oriented toward the outside of the display unit 3. A light-emitting source 89 is mounted at the display unit 3, more specifically, at the inner underside of the display housing 3b in such a fashion as to be disposed adjacent to the rectangular type system prism 88. A printed circuit board 3c is disposed the inner underside of the display housing 3b so that the light-emitting source 89 the light-emitting source 89 is electrically connected with a wiring (not shown) of the printed circuit board 3c so as to establish an electrical connection with the system control section 6 to thereby allow light to exit correspondingly to each operation of the haptic switching unit, more specifically, the haptic actuator and/or the capacitance type switch section. The light-emitting source 89 may be provided in plural numbers, and may be constructed of LED lamps for emitting light having more than two colors. The system prism 88 and the light-emitting source 89 included in the display unit 3 may be provided alone and/or may be provided together with the ring-type system prism denoted by reference numeral 86 and the light-emitting source denoted by reference numeral 87.

The light emitted from the light-emitting source 89 is incident to the rectangular incident surface 88a of the rectangular type system prism 88 and then exits to the outside through the rectangular exit surface 88c. The light-emitting source 89 is disposed on a line forming a maximum penetrating length so that the optical path inside the rectangular type system prism 88 can be maximized.

Figure 22:
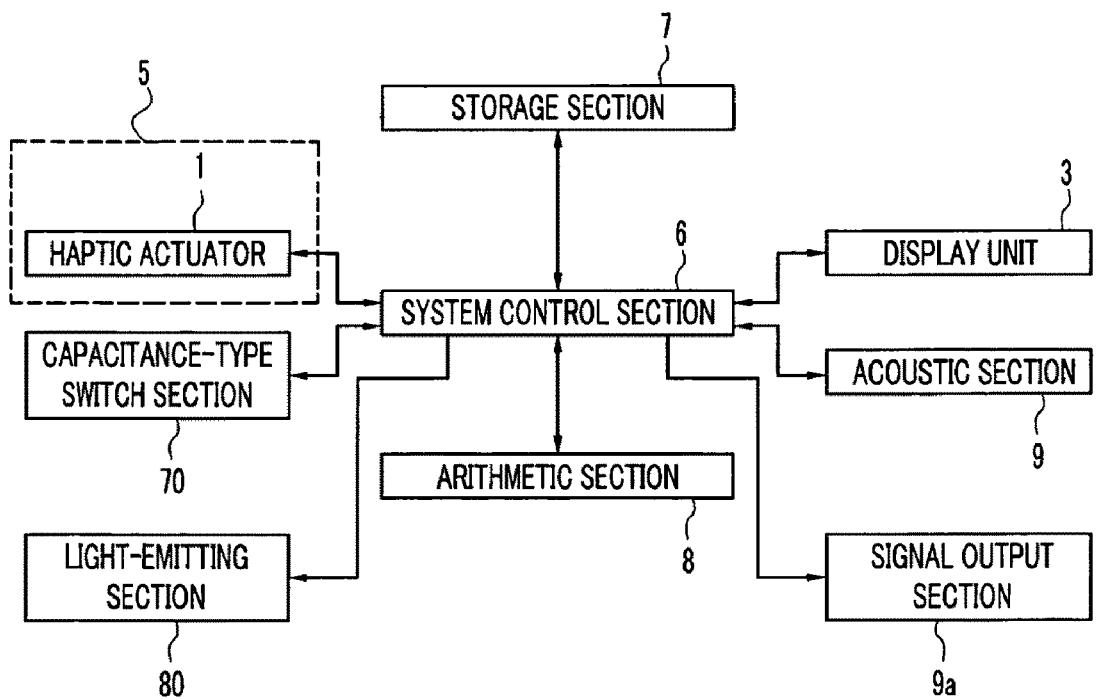
FIG. 22 is a schematic block diagram showing the construction of a sensation system of the present invention.
Figure 23:
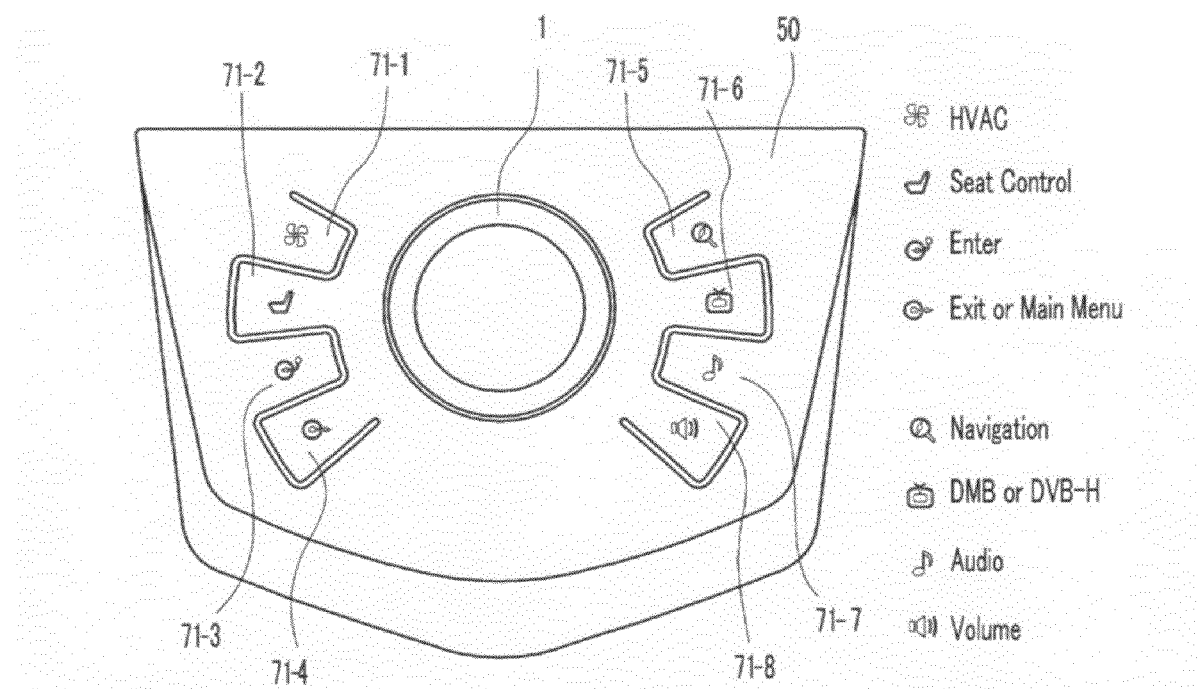
FIG. 23 is a schematic top plan view of a housing body showing one example of a capacitance type switch button of a haptic switching unit of the present invention.

FIG. 22 is a schematic block diagram showing the construction of a sensation system 2 of the present invention, and FIG. 23 is a schematic top plan view showing a haptic switching unit 5 of the sensation system 2 according to the present invention.

The sensation system 2 includes a haptic switching unit 5 including a haptic actuator 1 disposed at a system housing 4, a display unit 3, a system control section 6. The sensation system 2 may further include a storage section 7 and an arithmetic section 8. In this case, an explanation on the haptic actuator 1 and the capacitance type switch section 70 of the haptic switching unit 5 is replaced by the above explanation.

The system control section 6, the storage section 7 and the arithmetic section 8 may be disposed on a separate printed circuit board which can be together disposed at the system housing, and may be disposed on the printed circuit board 60, if necessary. The storage section 7 stores therein a preset pattern for a magnetic suction force generated between the core coil (not shown)/the rotary core 340 and the rotary suction portion 350. The storage section 7 may perform a buffer function of temporarily storing values calculated by the arithmetic section 4 which will be described below under any circumstances.

FIGS. 15 to 18 are schematic diagrams showing examples of a preset pattern of a magnetic suction force generated between the rotary core 340 and the rotary suction portion 350, which is stored in a storage section 2 of the sensation system according to one embodiment of the present invention.

The left graph in each drawing shows a pattern of magnetic suction force Fd acting depending on a rotational angle of the rotary knob 300, and the right diagram in each drawing schematically shows a resultant force ($=PT-F2=PT-\mu s\{Fd+Wc-Wd,s\}$) acting through the rotary knob 300 upon the application of an arbitrary uniform action force (PT) by a user.

Figure 15:
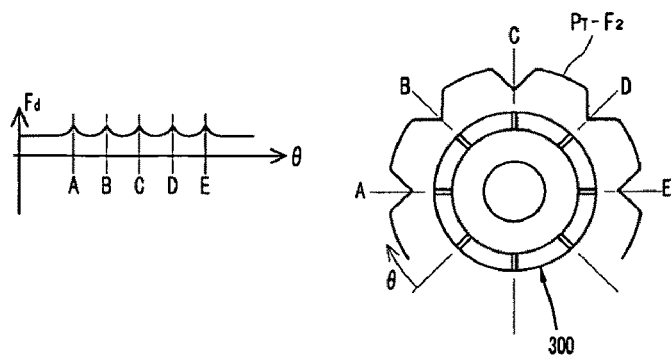
FIG. 15 is a schematic diagram showing a preset pattern of a magnetic suction force stored in a storage section of the sensation system according to one embodiment of the present invention and sensitivity of a force which a user senses through a rotary knob based on the preset pattern.
Figure 16:
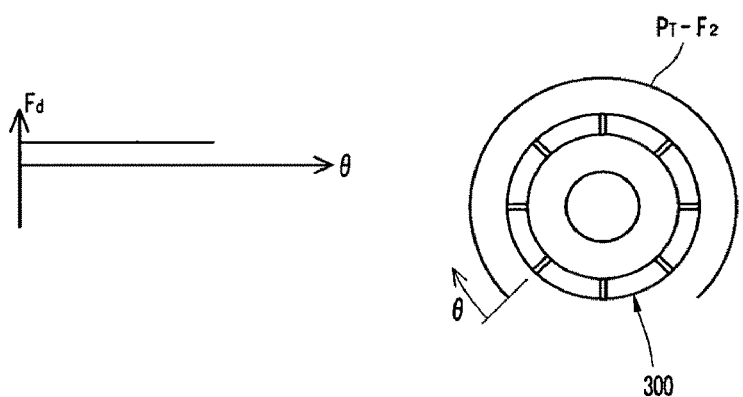
FIG. 16 is a further schematic diagram showing a preset pattern of a magnetic suction force stored in a storage section of the sensation system according to one embodiment of the present invention and sensitivity of a force which a user senses through a rotary knob based on the preset pattern.
Figure 17:
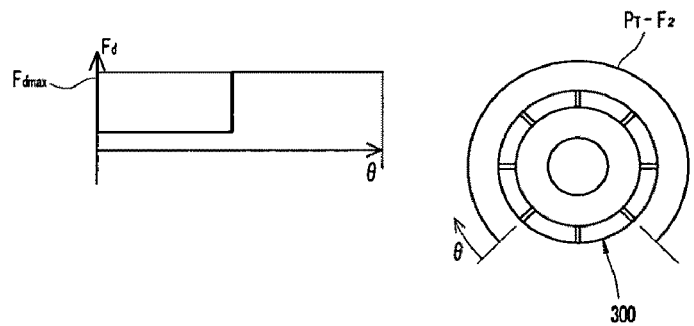
FIG. 17 is a further schematic diagram showing a preset pattern of a magnetic suction force stored in a storage section of the sensation system according to one embodiment of the present invention and sensitivity of a force which a user senses through a rotary knob based on the preset pattern.
Figure 18:
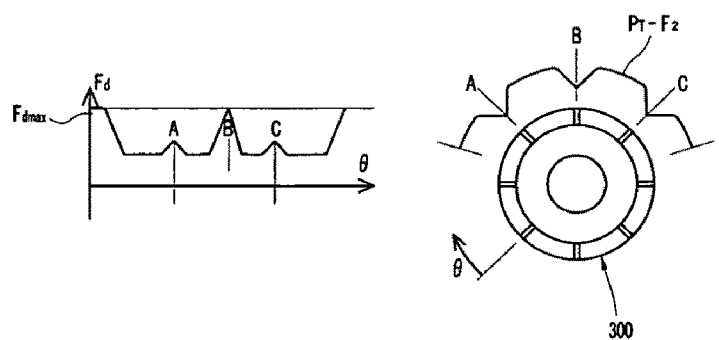
FIG. 18 is a further schematic diagram showing a preset pattern of a magnetic suction force stored in a storage section of the sensation system according to one embodiment of the present invention and sensitivity of a force which a user senses through a rotary knob based on the preset pattern.

FIG. 15 shows a detent pattern which increases temporarily at a predetermined angular position to cause a user to sense a detent feeling at the predetermined angular position, FIG. 16 shows a constant pattern in which a uniform magnetic suction force (Fd) is applied at all angular positions, FIG. 17 shows a barrier pattern in which a maximum magnetic suction force (Fd max) larger than an arbitrary uniform action force (PT) is provided with respect to a rotational angle θ beyond a predetermined angular position to thereby restrict the rotation beyond the predetermined angular position, and FIG. 18 shows a compound pattern in which more than two patterns are combined, i.e., the detent pattern is provided at angular positions A and C, and the barrier pattern is provided at an angular position B.

In FIGS. 15 to 18, there are shown a total of four magnetic suction force patterns, but this is merely an exemplary embodiment and more various patterns may be formed. Also, in FIGS. 15 to 18, there are shown an operation of the rotary switch section. Various magnetic suction force patterns may be formed with respect to the case where the haptic actuator is operated in a vibration mode. For example, an impact pattern may be formed in which a plurality of maximum magnetic suction force (Fd max) is applied during a short period so that an impact between the rotary core and the rotary disc occurs, and ultimately an impact between the rotary suction portion/ the rotary core and the fixing plate through the rotary elastic member occurs.

In the meantime, the storage section 2 according to the present invention may store a preset pattern for a magnetic suction force between the rotary core 340 and the rotary suction portion 350 of the haptic actuator as well as a preset pattern, i.e., an operating pattern for the light-emitting section corresponding to each operation of the haptic actuator and/or the capacitance type switch section of the haptic switching unit. For example, in case where the haptic actuator forms the detent pattern shown in FIG. 15, the light-emitting source of the light-emitting section generates a blue-colored light. In case where the haptic actuator forms the constant pattern shown in FIG. 16, the light-emitting source of the light-emitting section generates a white-colored light. In case where the haptic actuator forms the barrier pattern shown in FIG. 17, the light-emitting source of the light-emitting section generates a red-colored light. In case where the haptic actuator forms the compound pattern shown in FIG. 18, the light-emitting source of the light-emitting section generates a purple-colored light. Like this, the light-emitting section may emit light having a color corresponding to each operation of the haptic switch unit Moreover, the operation of the light-emitting section corresponding to the operation of the haptic switching unit stored in the storage section 7 may include a flickering or blinking operation. In case where each magnetic suction force pattern shown in FIGS. 15 to 18 is set to correspond to each operating mode of the haptic switching unit including the capacitance type switch section, the light-emitting section allows a light-emitting source having a corresponding color to be operated in an ON state upon the selection of each mode. In this case, the storage section 2 can previously store the number of flickerings, a flickering period or the like informing whether the selection operation has been completed upon the selection of a corresponding mode. The flickering operation may include a rapid flickering occurring several times upon the selection of a corresponding mode and a flickering occurring at any given period during the conduction of each mode. For example, in case where a volume switch button 71-8 of the capacitance type switch section, which will be described below, is selected during the operation of an audio mode, a corresponding capacitance type switch transfers an input signal to the system control section 6. Then, the system control section 6 transfers a signal indicative of a magnetic suction force corresponding to an associated volume operating mode previously set and stored in the storage section 7 to the haptic actuator, transfers a control signal for controlling the operation of the light-emitting section to the light-emitting source to cause the light-emitting source to emit a green colored light in response to the control signal. The emission of the green colored light from the light-emitting source is accompanied by a twice rapid flickering upon the selection of the volume mode and then a lighting state is maintained. When a user turns the rotary knob 300 of the haptic actuator, a variation of an electrical signal according to the rotation is transferred to the system control section 6 which in turns performs a blinking operation at a preset period in response to the variation of the electrical signal so as to allow the user to grasp the execution of the volume mode. When the manipulation of the haptic actuator through the rotary knob 300 is completed, the system control section 6 maintains the green light in a lighting state. When the user does not manipulate the rotary knob any more for a predetermined input time stored in the storage section 7, the system control section 6 causes the green light from the light-emitting source to be extinguished and causes the light-emitting source to emit an orange light corresponding to an existing audio mode so as to allow the user to recognize the operation state of the audio mode. That is, in case where a predetermined operating mode for the haptic switching unit is selected and performed by the user, the system control section 6 applies a control signal corresponding to the flickering operation previously set and stored in the storage section 7 to the light-emitting source so as to allow the light-emitting source to emit a corresponding color light and perform a flickering operation through an on/off control.

The arithmetic section 8 is electrically connected with the system control section 6 and calculates an electrical signal to be applied to the core coil. That is, when the haptic actuator is operated in a rotation mode, the arithmetic section 8 calculates current I necessary for applying a predetermined magnetic suction force based on the preset pattern of the magnetic suction force stored in the storage section 7 which is transferred thereto from the system control section 6 and the rotation amount of the rotary knob, particularly the rotary disc 355 (see FIG. 7) which is sensed by the rotation sensing section 600 (see FIGS. 7 and 8. The system control section 6 is electrically connected with the rotation sensing section 600, the storage section 7, the arithmetic section 4 and the core coil so that the application current I calculated by the arithmetic section 8 is applied to the core coil. In addition, system control section 6 determines whether the user selects which one of the rotation mode and the vibration mode with respect to the haptic actuator.

The system control section 6 may be electrically connected with the capacitance type switch section 70.

FIG. 23 is a schematic top plan view of a unit housing showing one example of a capacitance type switch button of a haptic switching unit of the present invention.

Referring to FIG. 23, the housing body 500 includes a plurality of capacitance type switch buttons 71-1, 71-2, 71-3, 71-4, 71-5, 71-6, 71-7 and 71-8. Capacitance type switch buttons can be implemented as an HVAC switch button 71-1, a seat control switch button 71-2, an enter switch button 71-3, an exit/menu switch button 71-4, a navigation switch button 71-5, a DMB switch button 71-6, an audio switch button 71-7 and a volume switch button 71-8.

Figure 24:
FIG. 24 is a schematic display picture showing an example of a user interface for a sensation system of the present invention.
Figure 25:
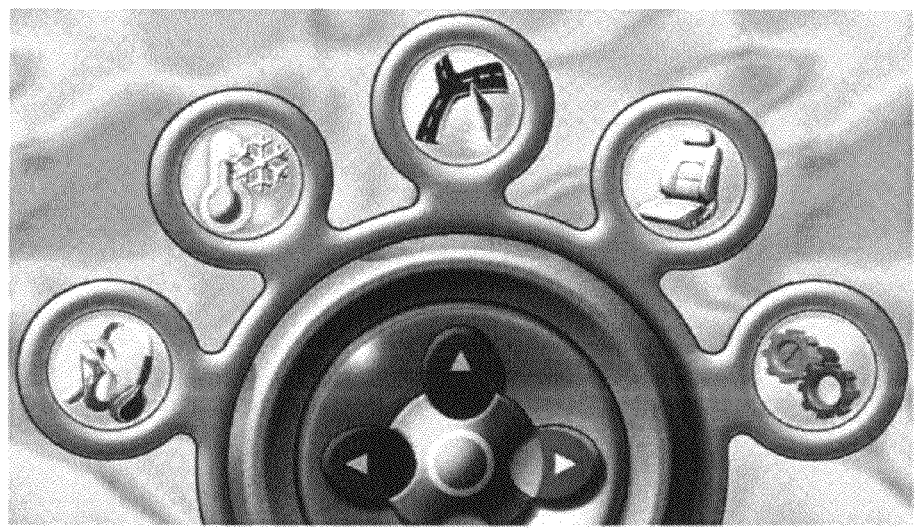
FIG. 25 is another schematic display picture showing an example of a user interface for a sensation system of the present invention.
Figure 26:
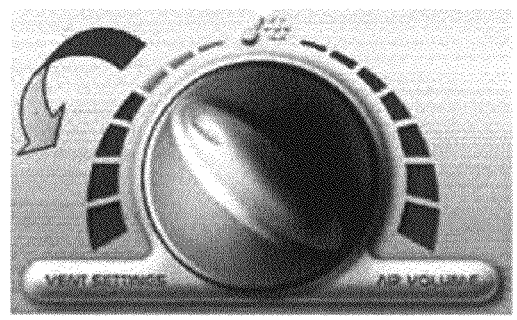
FIG. 26 is a schematic display picture showing an HVAC mode and an audio volume mode of a user interface for a sensation system of the present invention.
Figure 27:
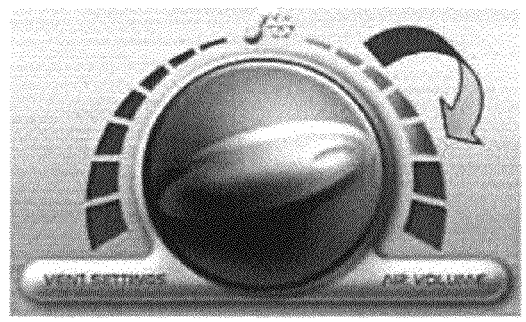
FIG. 27 is a further schematic display picture showing an HVAC mode and an audio volume mode of a user interface for a sensation system of the present invention.
Figure 28:
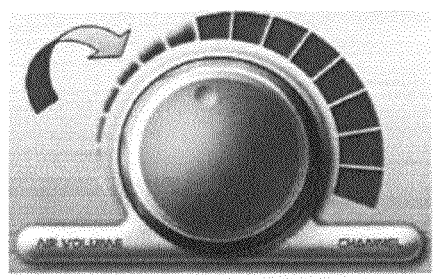
FIG. 28 is a further schematic display picture showing an HVAC mode and an audio volume mode of a user interface for a sensation system of the present invention.
Figure 29:
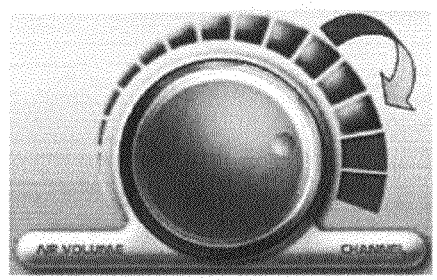
FIG. 29 is a further schematic display picture showing an HVAC mode and an audio volume mode of a user interface for a sensation system of the present invention.
Figure 30:
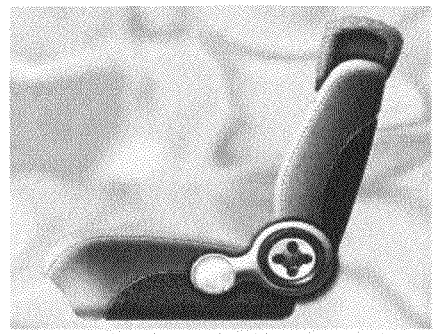
FIG. 30 is a further schematic display picture showing an HVAC mode and an audio volume mode of a user interface for a sensation system of the present invention.
Figure 31:
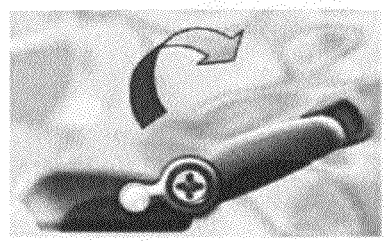
FIG. 31 is a further schematic display picture showing an HVAC mode and an audio volume mode of a user interface for a sensation system of the present invention.
Figure 32:
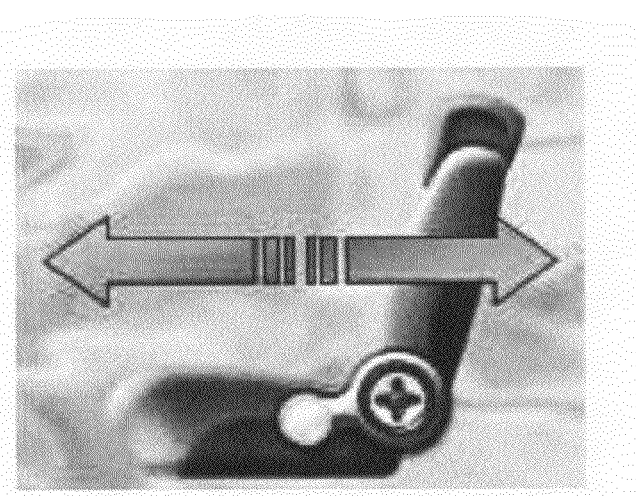
FIG. 32 is a further schematic display picture showing an HVAC mode and an audio volume mode of a user interface for a sensation system of the present invention.
Figure 33:
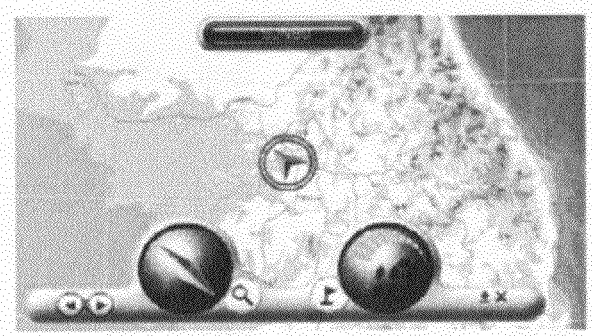
FIG. 33 is a further schematic display picture showing an HVAC mode and an audio volume mode of a user interface for a sensation system of the present invention.
Figure 34:
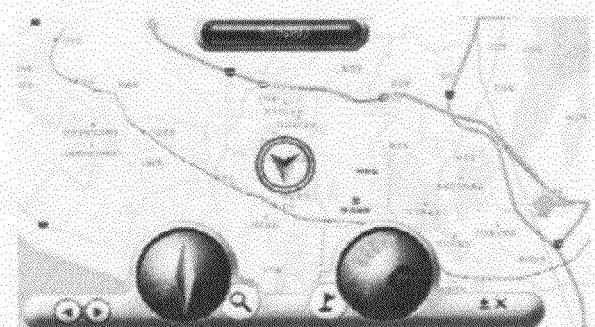
FIG. 34 is a further schematic display picture showing an HVAC mode and an audio volume mode of a user interface for a sensation system of the present invention.

When power is applied to the sensation system 2, the display unit 3 of the sensation system 2 displays an exemplary user interface as shown in FIGS. 24 and 25. Icons indicating operating modes of the respective capacitance type switches are displayed on the screen displayed on the display unit 2 as the user interface in such a fashion as to be arranged circumferentially around a display section positioned at the center of the haptic actuator. When the user manipulates each capacitance type switch button, an electrical signal generated due to a variation of the operation state of the capacitance type switch section is transferred to the system control section 6. Then, the system control section 6 allows the display unit 3 to display an image corresponding to the operating mode of each capacitance type switch button thereon. For example, when the user manipulates the HVAC switch button 71-1, the volume switch button 71-8, the seat control switch button 71-2 and the navigation switch button 71-5 of the capacitance type switch section included in the haptic switching unit, the system control section 6 allows the display unit 3 to display an HVAC user interface, an audio volume user interface, a seat control user interface and a navigation user interface, respectively, as shown in FIGS. 26 to 29. In the meantime, when the system control section 6 senses an electrical signal according to a variation of two capacitances, which is inputted simultaneously due to simultaneous manipulation of more than two capacitance type switch buttons, it may convert a state of an output of a control signal to various units corresponding to the display unit 3 and the switch buttons into a standby state so as to prevent an erroneous operation of a corresponding unit due to an erroneous manipulation of the capacitance type switch section. Here, although not shown in the drawing, the haptic switching unit of the sensation system may further include a separate temperature and humidity sensor so as to transfer information regarding an external operation environment according to the temperature and humidity of the sensation system to the system control section 6 to thereby perform a process of correcting an dielectric constant of the capacitance type switch electrode according to the temperature and humidity environment previously stored in the storage section 7. In addition, the storage section 7 stores information regarding the dielectric constant according to various environments so that a construction can be implemented which enables determination of a more precise operation state of the capacitance type switch section through a proper dielectric constant correction process according to the operation environment of the capacitance type switch section Thereafter, when the user manipulates the haptic actuator 1 (see FIG. 2), a rotation signal may be transferred to the system control section 6 by the rotation sensing section, and a button manipulating signal according to the manipulation of the button switch section 20 may be transferred to the system control section 6.

The system control section 6 transfers a control signal corresponding to the rotation signal or the button manipulating signal to an air-conditioning device for vehicles (not shown), an audio device (not shown), a seat motor (not shown) and a navigation device (not shown) through the electrical connection with the storage section 7 and the arithmetic section 8 so as to control these devices. During the above process, the system control section 6 that received the rotation signal supplies current as a control signal for activating the rotary switch section 30 to the core coil of the rotary switch section 30 depending on the preset pattern stored in the storage section 6 so as to activate the rotary switch section 30 to thereby provide a detent feeling to a user who turns the rotary knob. Also, the on/off operation of the light-emitting sources 81, 82, 87 and 89 of the light-emitting section 80 is controlled by means of the control signal generated from the system control section 6 so that a preset color and/or a flickering operation for a corresponding mode is controlled to thereby enable the user to more easily and rapidly recognize the operating mode being executed and the operating state. In addition, each operating state is transferred to the display unit 3 to allow each operating state such as air volume control of HVAC, audio volume up, seat inclining operation and forward/rearward movement, navigation exploration or the like to be displayed on the display unit 3 as shown in FIGS. 27, 29, 31 32 and 34.

During such a series of control processes for each device through the user interface, the system control section 6 may control a control sound effect to output the acoustic section 9 to allow the user to more easily recognize an operating mode being executed. The acoustic section 9 is electrically connected with the system control section 6 and can output an acoustic signal corresponding to each operation of the haptic switching unit 5 in response to a control signal generated from the system control section 6 in cooperation with the haptic switching unit 5. The storage section 7 previously stores various operating modes and the acoustic data corresponding to various operations.

For example, when the volume switch button 71-8 of the capacitance type switch section is selected during the execution of an audio mode, an associated capacitance type switch supplies an input signal to the system control section 6, which in turns applies a signal indicative of a magnetic suction force corresponding to an associated volume operating mode preset and stored in the storage section 2 to the haptic actuator and applies a control signal for operating the light-emitting section to light-emitting source. Also, when the system control section 6 applies a sound control signal to the acoustic section 9 based on the acoustic data corresponding to the associated volume operating mode, the acoustic section outputs an associated acoustic signal in response to the control signal. The emission of the green colored light from the light-emitting source is accompanied by a twice rapid flickering upon the selection of the volume mode and then a lighting state is maintained. At this time, a signal sound corresponding to the selection of the volume operating mode is generated twice and then an acoustic signal such as "volume control mode!" is outputted from the acoustic section 9. In this embodiment, although not shown definitely in the drawing, a separate digital signal processor (SDP) may be included in the sensation system.

When a user turns the rotary knob 300 of the haptic actuator, a variation of an electrical signal according to the turning of the rotary knob 300 is transferred to the system control section 6. Then, the system control section 6 controls the light-emitting section to perform a blinking operation at a preset period while emitting a green light as well as periodically generate a specific signal sound so as to allow the user to grasp execution of the volume mode in response thereto. Of course, an electrical signal for increasing/decreasing the volume in response to the turning of the rotary knob 300 by the user is transferred to an acoustic output section such as a speaker (not shown) to cause the volume of the speaker to be increased or decreased and hence the volume of the specific signal sound to be increased or decreased.

When the manipulation of the haptic actuator through rotary knob 300 is completed and there is no manipulation of the user for a preset input time stored in the storage section 7, the system control section 6 controls the light-emitting source to extinguish the green light and emit an orange light corresponding to the previous audio mode, and concurrently controls the acoustic section 9 to output an acoustic signal such as "audio mode!" according to the returning of the operation mode to the previous audio mode so as to allow the user to recognize the operating state of the audio mode.

Further, the sensation system 2 of the present invention may perform transmission and reception of a signal with an external device through the signal output section 9a so as to perform various operations such as updating navigation map information stored in the storage section 7, downloading current music files through the signal output section 9a or the like. In correspondence to this, the light-emitting section and/or the acoustic section outputs an optical signal and/or an acoustic signal for execution of an associated mode so as to enhance a perceivable range of a user through tactile sensation by the haptic actuator as well as visual and/or audible sensation to allow the user to more easily recognize the operating state of the sensation system.

In the meantime, in the above embodiments, while a structure has been described in which the light-emitting section includes the light-emitting source and the system prism, and the light-emitting source is implemented with LEDs, it is merely an exemplary embodiment of the present invention and the present invention is not limited thereto. Instead, various modifications of the light-emitting section can be made such as including a light-emitting source other than the LEDs and/or only a light-emitting source.

Figure 35:
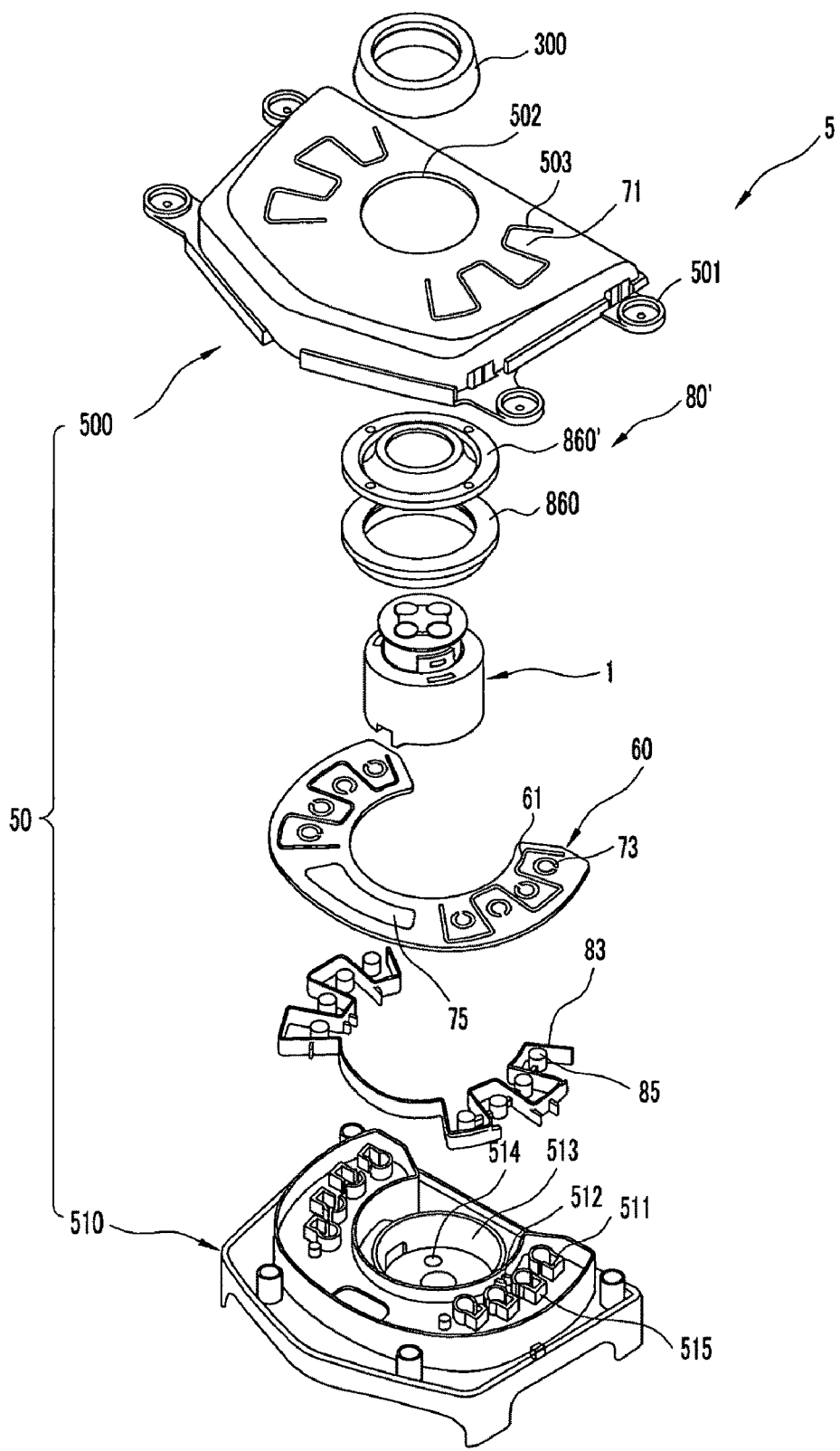
FIG. 35 is a schematic exploded perspective view showing a modification of a light-emitting section of a sensation system of the present invention.

FIG. 35 is a schematic exploded perspective view showing a modification of a light-emitting section of a sensation system of the present invention.

In this embodiment, the same elements as those in the above embodiment except a light-emitting section 80' are denoted by like reference numerals and an explanation thereof will be omitted due to redundancy.

The light-emitting section 80' includes a light-emitting source 860 and a protector 860'. The light-emitting source 860 which is an example of an electroluminescent (EL) device is implemented with an organic electroluminescent device.

The protector 860' is formed of a transparent material and performs a cover function of simply protecting the light-emitting source 860 while transmitting light emitted from the light-emitting source 860. Under any circumferences, the light-emitting section 80' may have a structure in which the protector 860' is excluded and the light-emitting source 860 is directly exposed to the outside.

Figure 36:
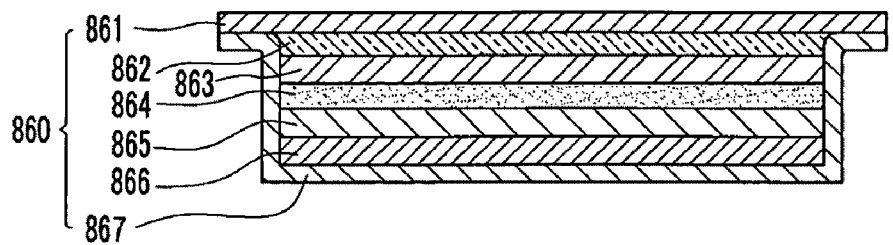
FIG. 36 is a schematic partial cross-sectional view showing a light-emitting source of the light-emitting section of FIG. 35.

FIG. 36 is a schematic partial cross-sectional view showing a light-emitting source of the light-emitting section of FIG. 35.

The light-emitting source 860 includes a substrate 867 made of glass, a first electrode 861 formed on one surface of the substrate 867, a second electrode 866 disposed spaced apart from the first electrode 861 in such a fashion as to be opposite to the first electrode 861, a hole injection/transporting layer 863, a light-emitting layer 864 and an electron transporting/injection 865 which are sequentially disposed in this order between the first electrode 861 and the second electrode 866. But this is merely an exemplary embodiment, and a modification can be made in a range of including the light-emitting layer disposed between the first electrode and the second electrode.

The first electrode 861 and the second electrode 867 are electrically connected with the system control section each other through a wiring. The first electrode 861 may be implemented with a transparent electrode made of at least one of ITO (indium tin oxide), IZO (indium zinc oxide), ATO (aluminum tin oxide) and ZnO (zinc oxide). The second electrode 867 may be implemented with a reflective electrode made of at least one of Ag, Mg, Al, Pt, Pd, Au, Ni, Ir and Cr. The hole injection/transporting layer 863 may be made of a material such as CuPc, NPD and the like, and the electron transporting/injection 865 may be made of a material such as Alq (tris(8-quinolinolato)aluminium), LiF and the like. The light-emitting layer 864 may be made of a material such as copper phthalocyanine (CuPc), Alq3 and the like. These electrodes and organic layers are hermetically sealed by means of a sealant 867 so as to prevent deterioration of an organic due to the contact with an external air. Whether light is emitted from the first electrode 862 and the second electrode 866 through the light-emitting layer is determined by an electrical signal applied from the system control section, so that the light can directly exit toward a user based on a determination result so as to allow the user to directly and rapidly recognize the operating mode of the haptic switching unit through the watching of the light besides the haptic function by the haptic switching unit.

In the above embodiments, while it has been described that a mode unit is implemented with the haptic switching unit, the implementation of the mode unit according to the present invention is not limited thereto.

Figure 37:
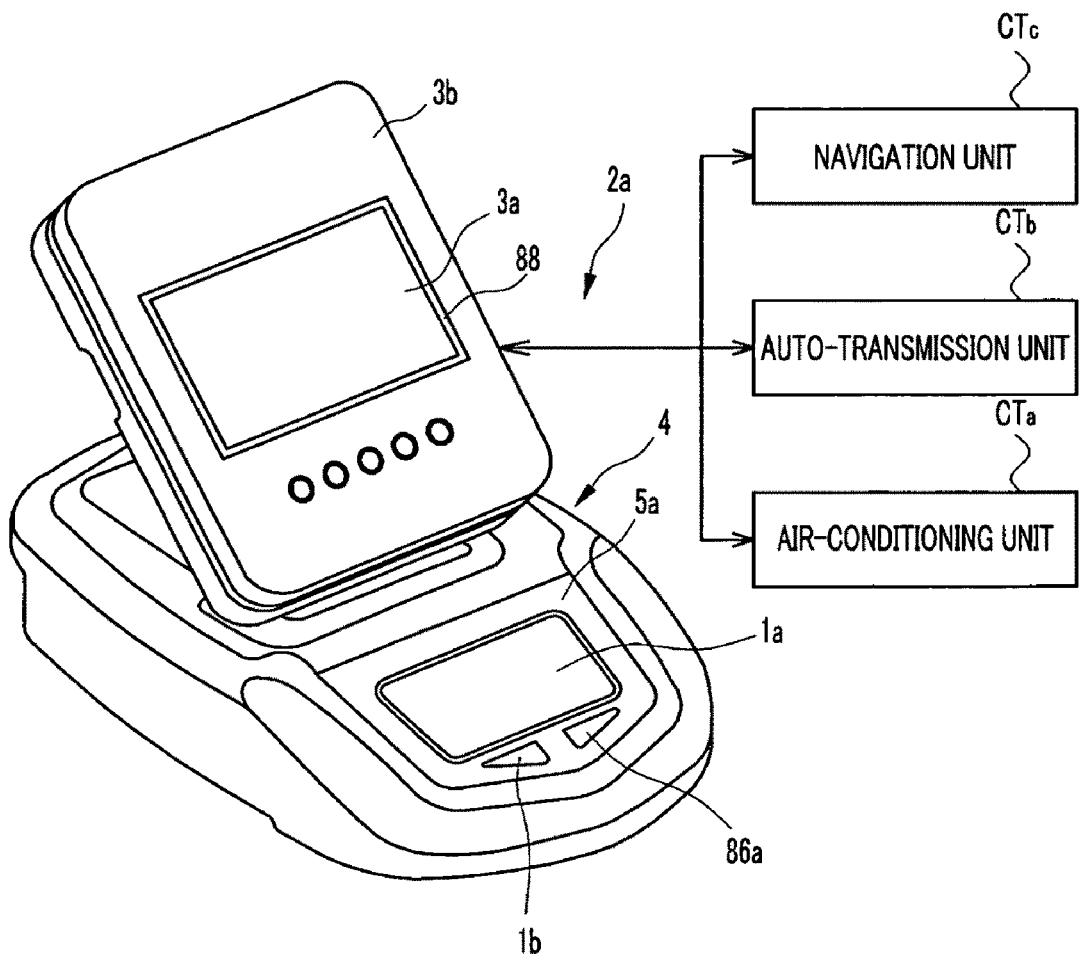
FIG. 37 is a schematic perspective view showing a sensation system according to another embodiment of the present invention.
Figure 38:
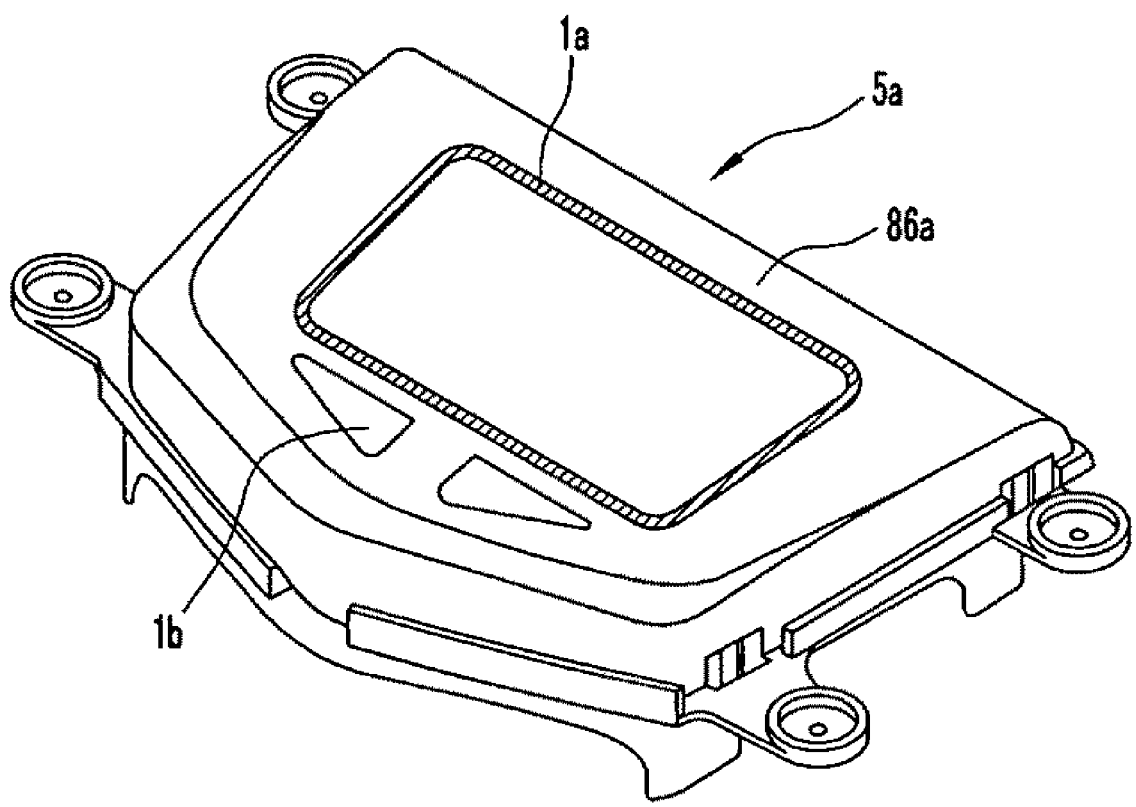
FIG. 38 is a schematic perspective view showing a haptic switching unit as another modification of a mode unit of a sensation system according to another embodiment of the present invention.

That is, FIGS. 37 and 38 are schematic and partial perspective views showing a sensation system 2a including a touch pad unit 1a as a mode unit according to another embodiment of the present invention. The construction will be described below in which the sensation system 2a according to the present invention is electrically connected with an air-conditioning unit CTa, an auto-transmission unit CTb and a navigation unit CTc so as to control each corresponding function. The same elements as those in the above embodiment are denoted by like reference numerals and an explanation thereof will be omitted due to redundancy.

The sensation system 2a includes a switching unit 5a as a mode unit. The switching unit 5a includes a touch pad 1a. A system prism 86a included in a light-emitting section is disposed adjacent to one side of the touch pad 1a. The system prism 86a is constructed to surround the circumference of the touch pad 1a. A light-emitting source (not shown) is disposed at a lower portion of the system prism 86a. The light-emitting source is disposed on a printed circuit board (not shown) mounted at the inside of the switching unit as a mode unit. The touch pad 1a can be typically implemented with a touch pad having a grid cell structure arranged in a longitudinal and transverse direction. The surface of the touch pad 1a may be formed as a touch screen in a range of being implemented as a touch-oriented user interface element such as executing a scroll operation for performing a predetermined function who each user desires through any touch of a user, and various modifications of the touch pad can be made. Outside the touch pad 1a may be provided a touch button 1b for selecting and confirming a function to be selected through a scroll function of the touch pad 1a. This touch button 1b may be constructed of a typical push button.

Figure 39:
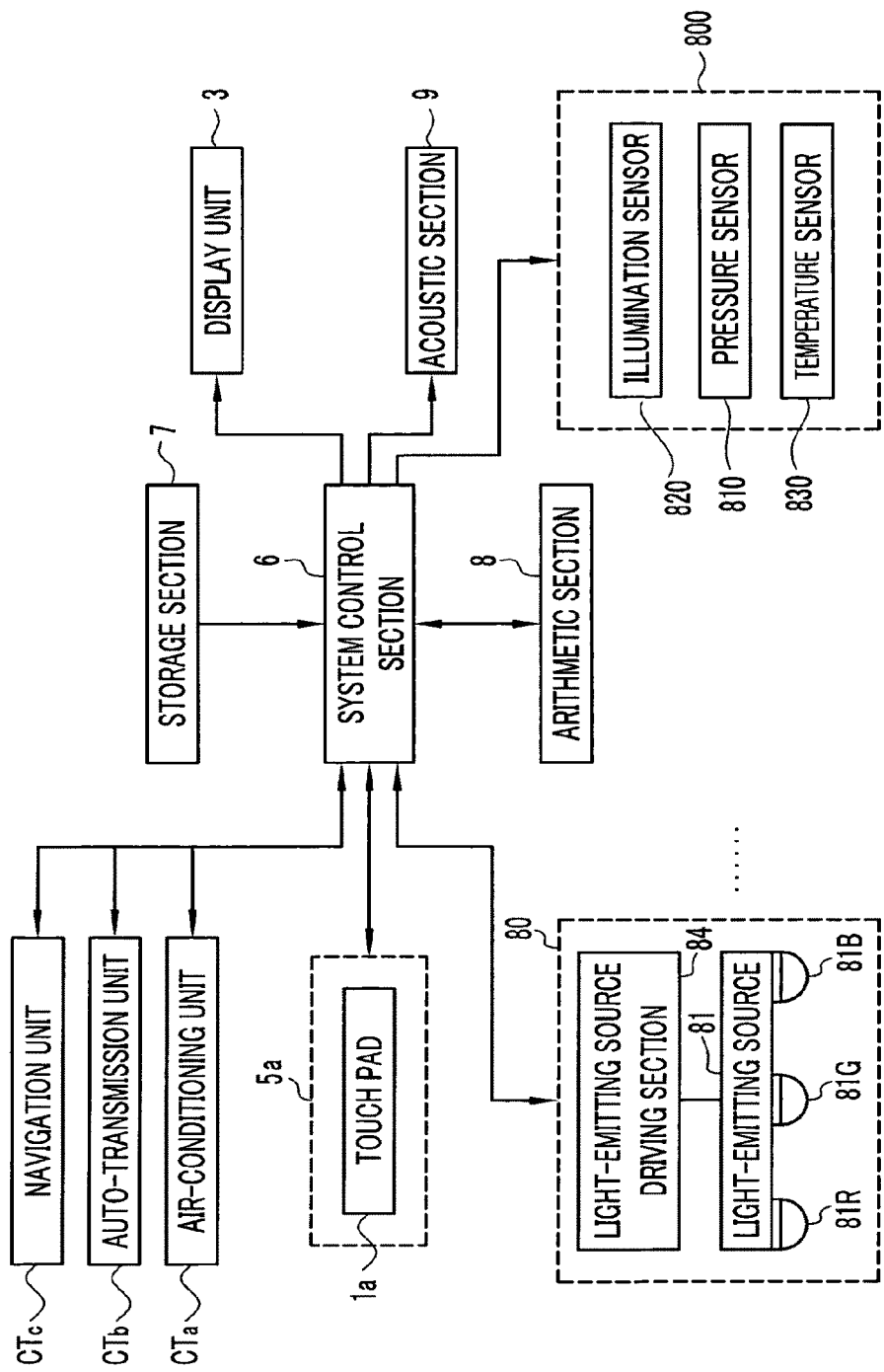
FIG. 39 is a schematic block diagram showing the construction of a sensation system according to another embodiment of the present invention.

FIG. 39 is a schematic block diagram showing the construction of a sensation system 2a including a switching unit 5a as a mode unit having a touch pad.

Referring to FIG. 39, the touch pad 1a included in the switching unit 5a is implemented as input means. The sensation system 2a includes a system control section 6, a storage section 7 and/or an arithmetic section 8. The system control section 6 is electrically connected with the touch pad 1a. The system control section 6 applies a control signal to each constituent element to perform a preset function which is previously set according to an input signal being inputted through the touch pad 1a and is stored in the storage section 7. Also, the system control section 6 is electrically connected with the light-emitting section 80. The system control section 6 applies a control signal generated therefrom to the light-emitting section based on a signal inputted through the touch pad 1a, and the light-emitting section 80 performs a light output function of emitting a predetermined light in response to the control signal applied thereto from the system control section 6. The light-emitting section 80 includes light-emitting sources 81R, 81G and 81B, and a light-emitting source driving section 84. The light-emitting sources 81R, 81G and 81B include a plurality of light-emitting sources having different colors. The plurality of light-emitting sources having different colors constitutes one set. That is, the light-emitting sources 81R, 81G and 81B include a red light-emitting source 81R for generating and emitting a red-based light, a green light-emitting source 81G) for for generating and emitting a green-based light, and a blue light-emitting source 81B for generating and emitting a blue-based light. The light-emitting source driving section 84 is a constituent element for controlling the driving output of the light-emitting sources 81R, 81G and 81B to generate and emit various colored lights. In this embodiment, the light-emitting source driving section 84 is implemented as a PWM driver for controlling the PWM, but this is merely an exemplary embodiment and the light-emitting source driving section of the present invention is not limited to the PWM driver.

Figure 40:
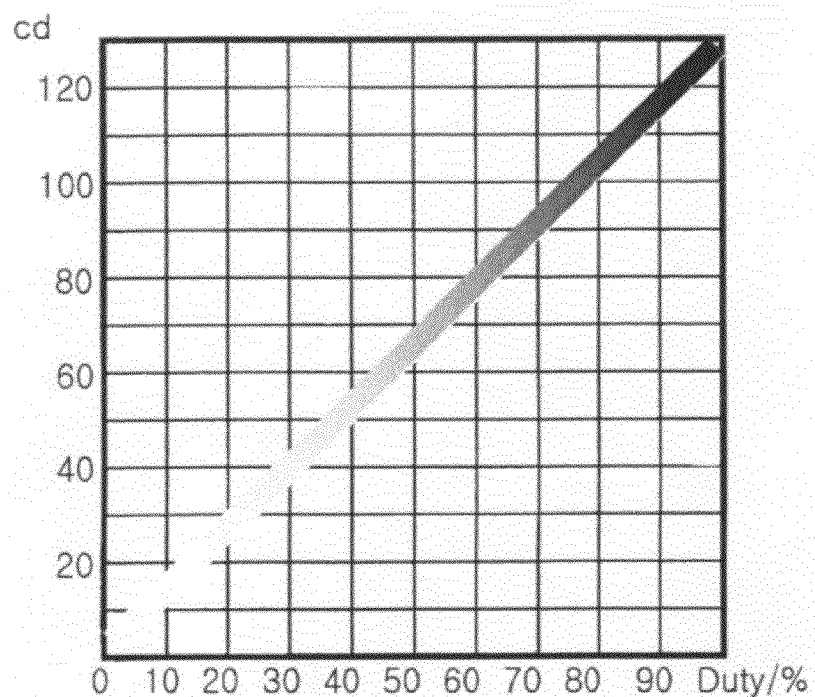
FIG. 40 is a schematic graph showing the relationship between a duty ratio and an illumination of a light-emitting source of a sensation system according to another embodiment of the present invention.

FIG. 40 is an illumination change graph showing a variation of an illumination for light-emitting sources 81R, 81G and 81B according to a duty ratio of the PWM control.

In FIG. 40, a maximum illumination by each of the light-emitting sources 81R, 81G and 81B is Cdmax. This illumination may include various values depending on a design specification of the light-emitting sources 81R, 81G and 81B. a variation of the illumination for each of the light-emitting sources 81R, 81G and 81B has a linear relationship with respect to the duty ratio. Likewise, the duty ratio controls of the light-emitting sources 81R, 81G and 81B are combined through the PWM control so as to express various colors.

Figure 41:
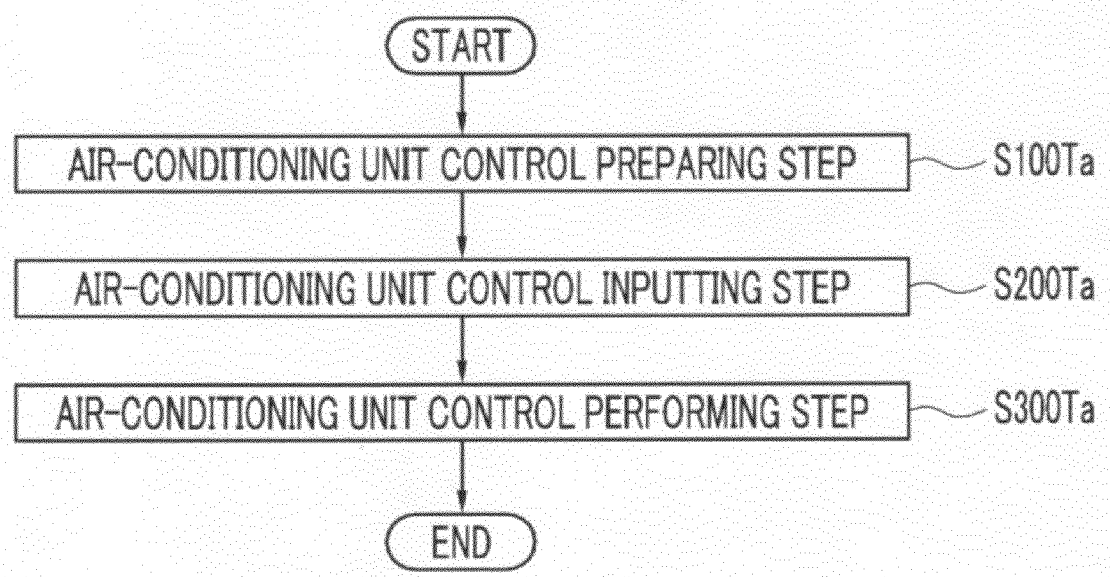
FIG. 41 is a flow chart showing a schematic control process of a sensation system according to another embodiment of the present invention.

FIG. 41 is a schematic flow chart showing a control process of the air-conditioning unit CTa as an example of a control process of a target device through a sensation system 2a according to another embodiment of the present invention.

In FIG. 41, the air-conditioning unit CTa is electrically connected with the system control section 6 as shown in FIG. The sensation system 2a further includes a sensing section 800 (see FIG. 39). The sensing section 800 includes a temperature sensor 830 for detecting the indoor temperature of a vehicle. In this embodiment, it is described that the sensation system 2a includes a temperature sensor 830, but various modifications can be made such as a modification where the temperature sensor may employ a temperature sensor included in the air-conditioning unit CTa, if necessary.

Figure 42:
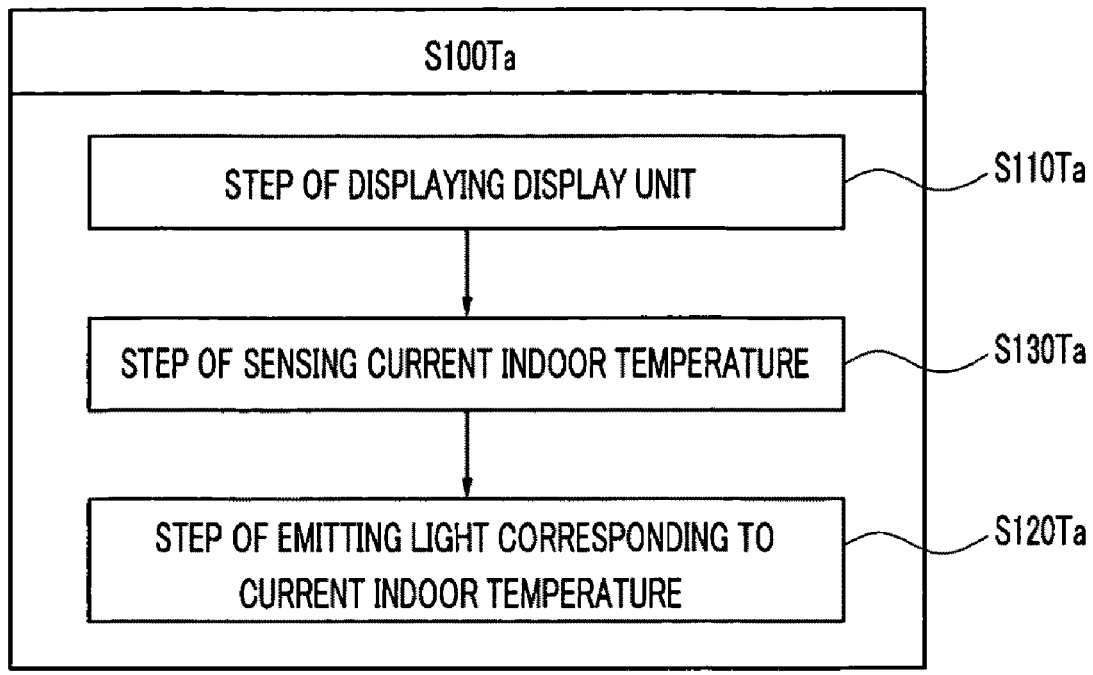
FIG. 42 is a flow chart showing an air-conditioning unit control preparing step in a schematic control process of a sensation system according to another embodiment of the present invention.
Figure 43:
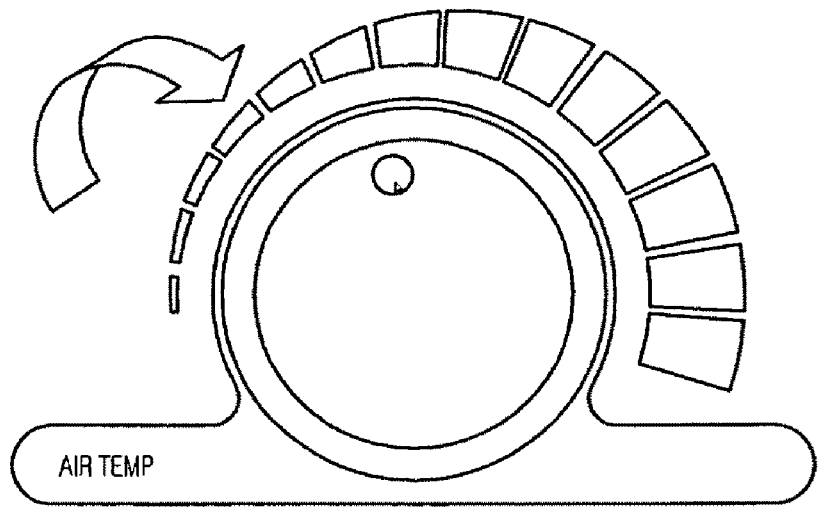
FIG. 43 is a schematic diagram showing a display screen of a user interface for an air-conditioning unit control inputting step in a schematic control process of a sensation system according to another embodiment of the present invention.
Figure 44:
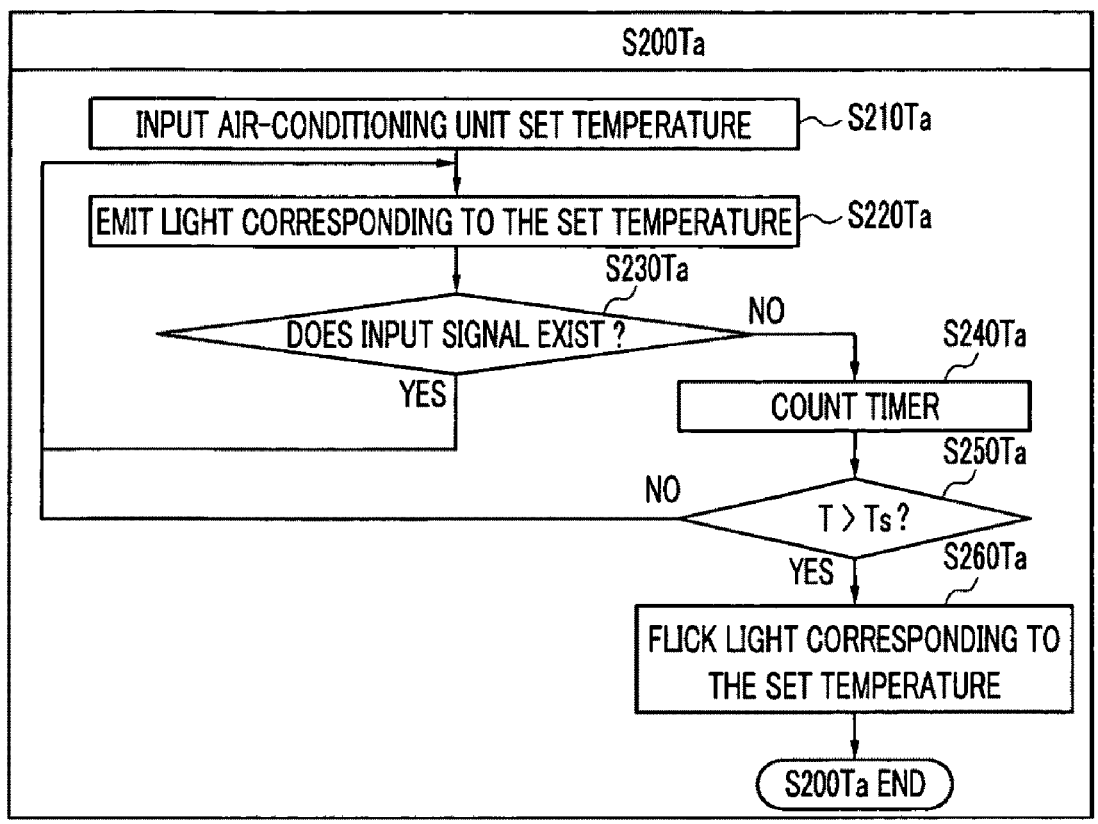
FIG. 44 is a flow chart showing an air-conditioning unit control inputting step in a schematic control process of a sensation system according to another embodiment of the present invention.

The control process of the air-conditioning unit CTa through the sensation system 2a includes an air-conditioning unit control preparing step (S100Ta), an air-conditioning unit control inputting step (S200Ta), and an air-conditioning unit control performing step (S300Ta). The air-conditioning unit control preparing step (S100Ta) performs a preparatory step necessary for controlling the air-conditioning unit CTa, the air-conditioning unit control inputting step (S200Ta) performs a step of allowing a user to input a control value to control the air-conditioning unit CTa, and the air-conditioning unit control performing step (S300Ta) performs a step of allowing the system control section to output a control signal for the control operation of the air-conditioning unit CTa correspondingly to the control value inputted by the user. More specifically, in FIG. 42 there is shown a control process of the air-conditioning unit control preparing step (S100Ta). The air-conditioning unit control preparing step (S100Ta) performs a step (S110Ta) of displaying a display unit, a step (S120Ta) of sensing a current indoor temperature, and a step of emitting light corresponding to the current indoor temperature. When a user selects a air-conditioning unit (CTa) control mode as a target to be controlled through the touch pad 1a, the display unit 3 (see FIG. 39) displays a user interface as shown in FIG. 43 thereon (S110Ta) and the system control section 6 applies a control signal to the temperature sensor 83 to control the temperature sensor 83 to sense the current indoor temperature of a vehicle to apply the sensed current indoor temperature thereto. Then, the system control section 6 applies a control signal to the light-emitting section 80 to control the light-emitting section 80 to emit light having a color of illumination corresponding to the sensed current vehicle indoor temperature. In this case, information regarding the light having a color of illumination corresponding to the sensed current vehicle indoor temperature is preset and stored in the storage section 7. The control signal applied to the light-emitting section 80 is transferred to the light-emitting source driving section 84. Then, the light-emitting source driving section 84 outputs a signal corresponding to each duty ratio for light-emitting sources for emitting light having each color for deriving an illumination of a gigen color, i.e, a red light-emitting source (81R), a green light-emitting source (81G), and a blue light-emitting source (81B). At this time, each of the light-emitting source 81R, 81G and 81B outputs light according to the inputted duty ratio to cause the outputted light having each color to be mixed so as to be emitted to the outside (S130Ta).

The user can easily recognize through light emitted to the outside and can easily determine whether or not to control the temperature.

In case where a user determines the temperature control needs to be performed, the manipulation of the touch pad 1a and/or the touch button 1b as the user interface according to this embodiment can be carried out to thereby execute the temperature control mode. In other words, a user manipulates the touch pad 1a as the switching unit 2a as a mode unit to position an indication pointer (indicated by arrow) at a temperature control switch knob (FIG. 43) for the temperature control of the air-conditioning unit (CTa), and then selects the temperature control switch knob (FIG. 43) for controlling the air-conditioning unit (CTa) using the touch button 1b. When the user performs a scrolling action on the touch pad 1a to turn the temperature control switch knob (FIG. 43) after selecting the temperature control switch knob (FIG. 43), a signal indicating the position movement on the touch pad 1a according to the scrolling action is transferred to the system control section 6 from the touch pad 1a so as to perform a step (S210Ta) of inputting the set temperature of the air-conditioning unit. Thereafter, the system control section 6 controls the light-emitting section 80 to emit light corresponding to the set temperature so as to perform a step (S220Ta) of emitting light corresponding to the set temperature. In the step (S220Ta), the system control section 6 selects a set temperature value of the air-conditioning unit (CTa) corresponding to the position movement from the touch pad 1a through the electrical connection with the storage section 7 and applies a control signal for emitting light having a preset color to the light-emitting section 80 in correspondence with the selection of the set temperature value. When the light-emitting section 80 applies a PWM control signal generated from the light-emitting source driving section 84 to each of the light-emitting sources 81R, 81G and 1B in response to the control signal applied thereto, the light-emitting sources 81R, 81G and 1B generate and emit light having an given illumination for each color according to a dury ratio of the applied PWM control signal to thereby emit the light corresponding to the set temperature value for the air-conditioning unit CTa inputted by the user through the user interface.

Thereafter, the system control section 6 performs a step (S230Ta) of determining whether or not there exists an input signal through the touch pad 1a and/or the touch button 1b. In the step (S230Ta), if there exists the input signal, the program returns to the previous step (S220Ta) where the system control section 6 maintains a state of emitting the light corresponding to the set temperature. On the other hand, if there exists no input signal, the program proceeds to a timer counting step (S240Ta) where the system control section 6 activates a timer as a clock embedded therein. In this embodiment, it has been described that the timer is embedded in the system control section 6, but various modifications of the timer can be made such as including a separate timer, if necessary. Then, the program proceeds to a time comparison step (S250Ta) where the system control section 6 determines whether or not the counted time (T) is larger than the preset input signal standby time (Ts). If it is determined at the time comparison step (S250Ta) that the counted time (T) is smaller than the preset input signal standby time (Ts), the program returns to the previous step (S220Ta) where the system control section 6 repeatedly performs the above process. If, on the other hand, the counted time (T) is larger than the preset input signal standby time (Ts), the program proceeds to a step (S260Ta) where the system control section 6 controls the light-emitting section to flicker light corresponding to the set temperature. Such a flickering operation in which light corresponding to the set temperature is flickered several times enables a user to easily and promptly recognize a level of the temperature sat by the user.

Subsequently, the air-conditioning unit control inputting step (S200Ta) through the touch pad 1a is terminated, and then the system control section 6 applies the signal for the set temperature in the air-conditioning unit control inputting step (S200Ta) to the air-conditioning unit CTa and controls the air-conditioning unit CTa to perform a air-conditioning unit control performing step (S300Ta) for maintaining a vehicle indoor temperature at the set temperature set by the user.

In this embodiment, although not shown definitely in the drawing, after the step (S260Ta) of the air-conditioning unit control inputting step (S200Ta) has been terminated, the system control section 6 may supply a control signal to the light-emitting section 80 to further perform a step of generating and emitting light corresponding to the current temperature. That is, the system control section 6 may supply a control signal to the light-emitting section 80 so as to sense the current vehicle indoor temperature at every predetermined period and emit light having a color corresponding to the sensed current vehicle indoor temperature.

Figure 45:
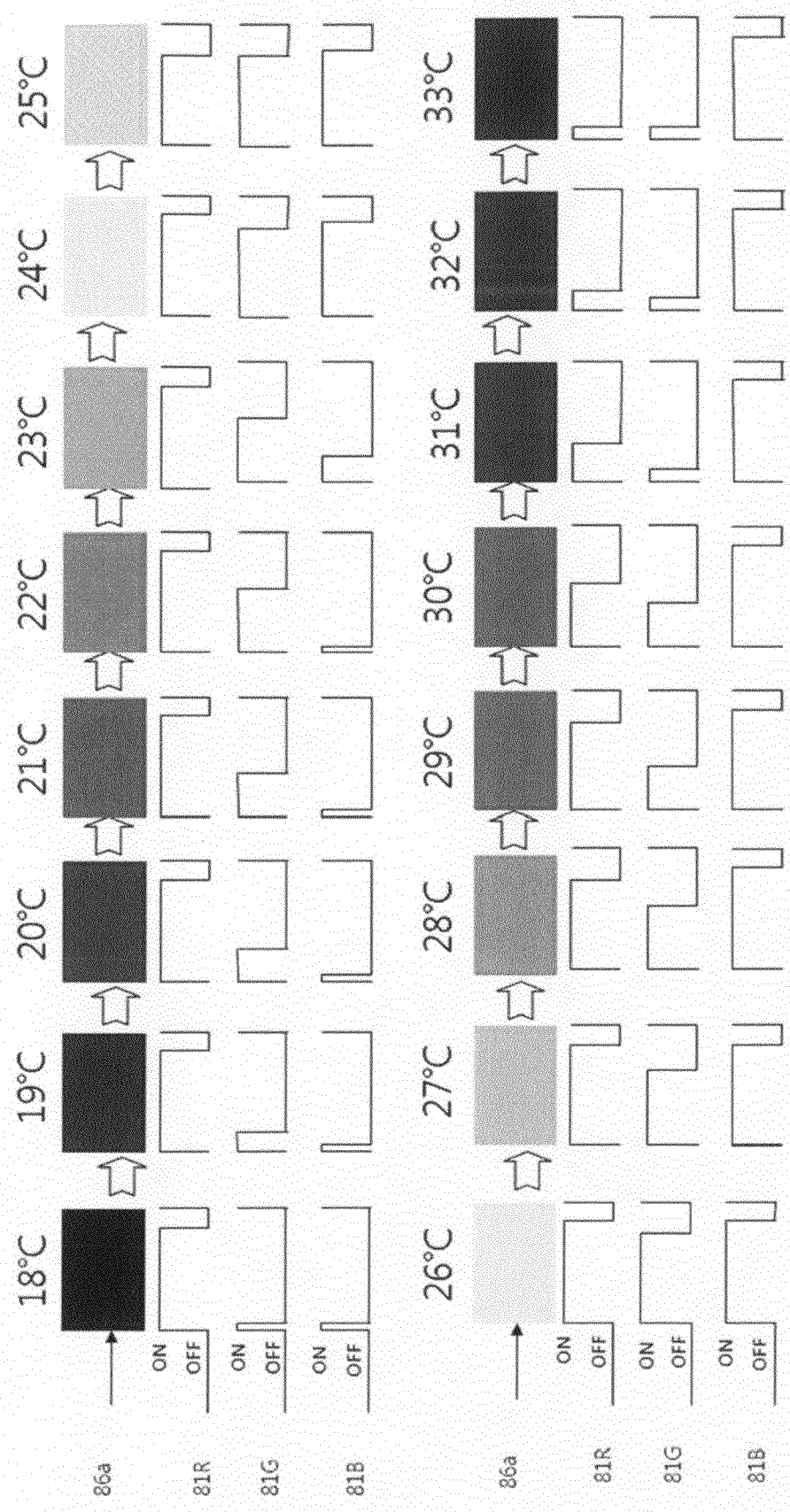
FIG. 45 is a schematic diagram showing the comparison between colors of light emitted from a light-emitting source through an air-conditioning unit control performing step in a schematic control process of a sensation system and a duty ratio of a PWM control for each light-emitting source transferred to a light-emitting source driving section according to another embodiment of the present invention.

Referring to FIG. 45, through the above processes, when the PWM control signal of each duty ratio is applied to the light-emitting sources 81R, 81G and 81B of the light-emitting section 80, each of the light-emitting sources 81R, 81G and 81B generates and emits light in response to the applied PWM control signal so that the emitted different lights can be mixed to cause light having a preset color corresponding to the an associated vehicle indoor temperature to be finally outputted. In this embodiment, the light outputted from the light-emitting sources 81R, 81G and 81B exits to the outside through a constituent element such as the system prism 86a, but this is merely an exemplary embodiment and the present invention is not limited thereto. As shown in FIG. 45, the PWM control signal according to the duty ratio for the light-emitting sources 81R, 81G and 81B enables light having various colors corresponding to each vehicle indoor temperature to exit to the outside so as to allow a user to easily recognize the operating state of the sensation system. That is, if the indoor temperature of a vehicle is low, a blue-based light exits to the outside whereas if the indoor temperature of a vehicle is high, a red-based light exits to the outside, such that a user can sense an approximate temperature range of the vehicle indoor temperature through a prompt perception of the color of light although a display device such as the display unit does not display any character indicative of a current vehicle indoor temperature. In addition, under any circumstances, air-conditioning unit control inputting step (S200Ta) may further include, after the step S260a, a step of allowing the system control section to generate a control signal so that if the current vehicle indoor temperature is within a predetermined range of the vehicle indoor temperature (for example, ±3° C. of the set temperature), the light-emitting sources emit a white-base light, so that if the current vehicle indoor temperature is smaller than a predetermined range of the vehicle indoor temperature, the light-emitting sources emit a red-base light, and so that if the current vehicle indoor temperature is larger than a predetermined range of the vehicle indoor temperature, the light-emitting sources emit a blue-base light, thereby visually complementing the sensible temperature which the occupant of the vehicle feels from the current vehicle indoor temperature The color of light corresponding to this indoor temperature is data for each control signal for generating and emitting the light, and is stored in the storage section 7 information regarding light corresponding to the current vehicle indoor temperature can be configured of the same information as the data for producing light corresponding to a current vehicle indoor temperature value set by the user. In addition, in the step S260Ta, the flickering operation of the light-emitting source is an operation for indicating that the setting of the temperature for the air-conditioning unit (CTa) has been completed. In the flickering operation, the number of flickerings, the flickering period or the like can be variously selected. Also, various modifications can be made in a range of allowing a user to easily recognize the operating state of the sensation system such as emitting light of various colors indicating the completion of the setting of the temperature besides the flickering operation.

In the meantime, in the above embodiment, while it has been described that the sensing section 800 includes the temperature sensor 830 for controlling the air-conditioning unit CTa, the temperature sensor 830 may further include another sensor besides the temperature sensor 830 so that various operation functions of the sensation system may be performed. That is, as shown in FIG. 39, the sensing section 800 may further include a pressure sensor 810. The pressure sensor 810 is mounted at a vehicle seat so that if a passenger is seated on a seat, a variation of a single sensed by the pressure sensor 810 is transferred to the system control section 6. The pressure sensor may be formed of a strain gauge structure, a piezo type and the like. Various modifications of the pressure sensor can be made. The system control section 6 determines whether or not any passenger exists in a passenger compartment of the vehicle based on the variation of the signal applied thereto from the pressure sensor 810, and applies a control signal to the light-emitting source driving section of the light-emitting section so as to adjust an illumination of light emitted from the light-emitting sources depending on whether or not the passenger exists in the passenger compartment.

For example, in case where a passenger takes off a vehicle while temporarily maintaining a parking operation in a state where the vehicle is is being started up, the pressure sensor mounted at the seat of the passenger generates a varied sensing signal for application to the system control section 6, which in turn determines whether the passenger gets on or get off the vehicle based on the varied sensing signal. As a result of determination, if a driving signal for controlling the PWM control is applied to the light-emitting sources 81R, 81G and 81B of the light-emitting section 80 from the light-emitting source driving section 84, the system control section 6 controls the driving signal to perform a correction process such as interruption of emission of light or reduction of an illumination of the light so as to prevent unnecessary irradiation of light to thereby improve durability of the light-emitting section.

Moreover, the sensing section 800 may include an illumination sensor 820. The illumination sensor 820 may be disposed at the interior of the vehicle such as a dashboard (not shown) of the vehicle, a room lamp (not shown) or the like. A signal indicative of an illumination sensed by the illumination sensor 820 is also applied to the system control section 6, which in turn senses a variation of the signal applied thereto from the illumination sensor 820 and control the control signal to be applied to the light-emitting section 80 based on the sensed signal variation. That is, in case where the interior of the vehicle is bright and an illumination is high, a signal indicating the high illumination sensed by the illumination sensor 820 is applied to the system control section 6, which in turn compares the signal sensed from the illumination sensor 820 with a signal indicating a reference illumination value which is previously set and stored in the storage section 7. If the sensed illumination value is larger than the reference illumination value, the system control section 6 controls a control signal to be applied to the light-emitting section 80 to allow light of a higher illumination to be emitted to the interior of the vehicle so that a user can more easily recognize the light emitted from the light-emitting section with respect to a brighter surrounding environment. On the other hand, if the system control section 760 determines that the sensed illumination value is smaller than the reference illumination value, it controls a control signal to be applied to the light-emitting section 80 to allow light of a lower illumination to be emitted to the interior of the vehicle so that driving attention of a user, i.e., a driver can be prevented from being drastically decreased due to a deterioration of driving concentration caused by emission of an excessive light can more easily recognize the light emitted from the light-emitting section with respect to a brighter surrounding environment.

In another modified embodiment, the sensation system 2a according to the present invention may be constructed to recognize a transmission state of an automatic transmission unit CTb (see FIG. 39).

Figure 46:
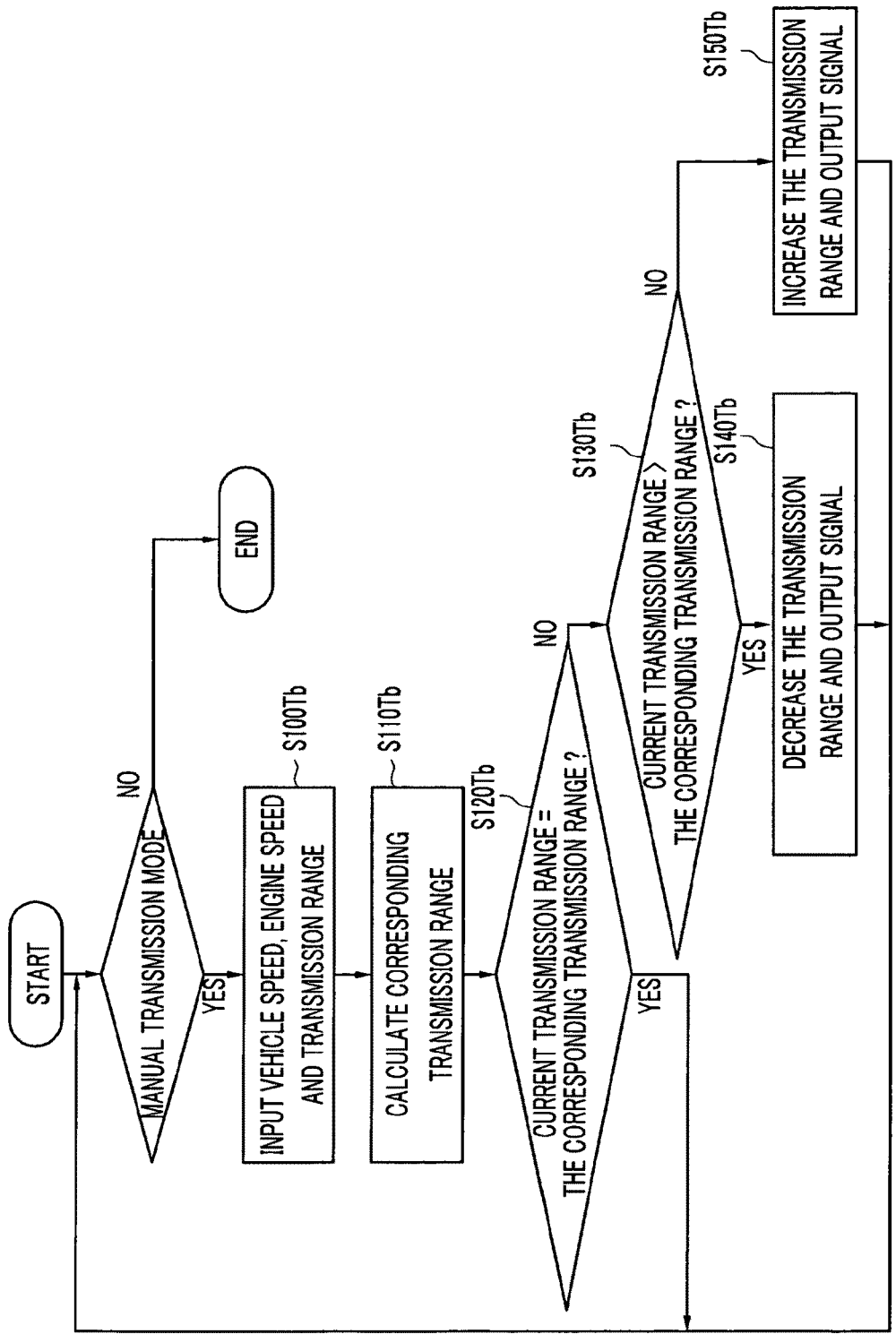
FIG. 46 is a schematic flow chart showing a control process of a manual transmission mode of an automatic transmission unit of a sensation system according to another embodiment of the present invention.

FIG. 46 is a schematic flow chart showing a control process of a sensation system 2a for enabling recognition of a transmission state of an automatic transmission unit according to another embodiment of the present invention.

Referring to FIG. 46, in case of an automatic transmission unit enabling a manual transmission manipulation, when a user converts a transmission mode into a manual transmission mode through a manipulation of a transmission lever (not shown), a signal indicating the conversion of the manual transmission mode is applied to the system control section 6. The system control section 6 determines whether or not the manual transmission mode is executed by the user (S10Tb). If the system control section 6 determines that the manual transmission mode is not selected by the user, the program is terminated. On the other hand, if it is determined at step S10Tb that a transmission mode is converted into the manual transmission mode by the user, the program proceeds to step S100Tb where the system control section 6 allows the user to input information on a vehicle speed, an engine speed and a current selected transmission range. The vehicle speed and the engine speed can be inputted through a speedometer and a tachometer, respectively. The current transmission range can be transferred from an inhibitor switch of the automatic transmission unit CTb. The system control section 6 applies a control signal to the arithmetic section 8 (see FIG. 39) to allow the arithmetic section 8 to calculate a transmission range adapted to a current vehicle environment based on the vehicle speed, the engine speed and the current transmission range which have been all inputted. The engine-transmission map data for the vehicle speed, the engine speed and the transmission range is preset and stored in the storage section 7. The arithmetic section 8 calculates information on an optimum transmission range corresponding to the current vehicle speed and engine speed using the stored engine-transmission map data through the electrical connection with the storage section 7 (S110Tb). Subsequently, the program proceeds to step S120Tb where the system control section 6 compares a corresponding transmission range calculated by the arithmetic section 8 with the current transmission range. If the current transmission range is identical to the corresponding transmission range, the program returns to the previous step S10Tb to repeatedly the above steps based on the determination of the system control section 6 that a proper transmission state is achieved. On the other hand, if the current transmission range is not identical to the corresponding transmission range, the program proceeds to step S130Tb where the system control section 6 determines whether or not the current transmission range is larger than the corresponding transmission range. At this time, the value of the transmission range can be preset as a level such as 1, 2, 3, 4, 5, etc., relative to D as a driving state, and in step S130Tb if the system control section 6 determines that the current transmission range is larger than the corresponding transmission range, the program proceeds to step S140Tb where the system control section 6 decreases the current transmission range value and outputs a signal indicating the decrease of the current transmission range value. If, on the other hand, at S130Tb that it is determined the current transmission range is smaller than the corresponding transmission range, the program proceeds to step S150Tb where the system control section 6 increases the current transmission range value and outputs a signal indicating the increase of the current transmission range value. At this time, at the steps S140Tb and S150Tb, the output of the signal means the output of the control signal to be applied to the light-emitting section 80. For example, during the driving of a vehicle in the manual transmission mode, the system control section 6 can control a control signal to be applied to the light-emitting source driving section 84 to control each duty ratio for the red light-emitting source, the green light-emitting source and the blue light-emitting source so that when the current transmission range is smaller than the corresponding transmission range, the blue-based light is emitted, and when current transmission range is larger than the corresponding transmission range, the red-based light is emitted. Likewise, in the manual transmission mode, a user can recognize whether or not a proper transmission range is set and the time point when the transmission is made through an associated emitted light, thereby reducing unpleasantness due to an excessive engine noise caused by a miss of transmission timing as well as an excessive load exerted to the engine/the automatic transmission unit while a driver has a feeling of driving manipulation through the manual transmission.

Further, the sensation system 2a according to the present invention may a structure which is operated in cooperation with the navigation unit. The sensation system 2a may be constructed such that the vehicle driving speed from the navigation unit CTc (see FIG. 39) is compared with a driving limitation speed in a front overspeed sensing area where a vehicle is driven so as to allow the user to optically recognize a driving speed state of the vehicle through the light-emitting section 80. That is, the system control section 6 may compare the current vehicle speed with the driving limitation speed at the front overspeed sensing area inputted from the navigation unit CTc, and may apply a control signal to the light-emitting source driving section 84 of the light-emitting section 80 so that the light-emitting section 80 divides a difference between the two speeds at a given ratio to emit light of a color for a corresponding speed difference ratio. For example, in case where the driving limitation speed at the front overspeed sensing area is 100 km and the current vehicle driving speed is 80 km, when expressing in percentage, a driving speed ratio obtained by dividing a difference between the current vehicle driving speed and the driving limitation speed, i.e., −20 km by the driving limitation speed, −20 is obtained. When a ratio of a difference between the both speeds to the driving limitation speed, i.e., the driving speed ratio is −30, light from the light-emitting source is set as a blue-based light, and when the driving speed ratio is −30, light from the light-emitting source is set as a red-based light. Likewise, the light from the light-emitting source may stored in the storage section 7 such that a range of the driving speed ratio between −30 and 0 is divided into several levels and then color data of light corresponding to each level is set as light of a color forming a stepwise conversion from a blue-based color to a red-based color. Thus, when the system control section detects any overspeed sensing area where a vehicle is driven from the navigation unit CTc, the navigation unit CTc applies a signal indicative of whether or not the sensed overspeed sensing area exists and the driving limitation speed to the system control section 6. In addition, the vehicle tachometer (not shown) transfers a signal indicating the sensed vehicle speed to the system control section 6. The system control section 6 controls the arithmetic section to calculate a difference between the current vehicle speed and the driving limitation speed based on the applied signal. Also, the arithmetic section calculates a driving speed ratio based on the calculated difference and the driving limitation speed, and compares the calculated driving speed ratio with the preset driving speed ratio. The system control section 6 applies a control signal for emitting light of a color corresponding to the preset driving speed ratio within which the calculated driving speed ratio falls to the light-emitting section 80. Then the light-emitting section 80 allows the light-emitting source driving section 84 to output a certain PWM control signal in response to the applied control signal so as to cause the light-emitting source to emit a given light. The emission of the light can be made continuously and periodically unit 1 the front overspeed sensing area is terminated. For example, in case where since the current vehicle speed is larger than the driving limitation speed, the calculated driving speed ratio has a positive (+) percentage value, the light-emitting source emits a red-based light in such a fashion that the light is emitted continuously or flickered at a given period, through which a driver can promptly recognize the driving speed state of the vehicle and reduce the vehicle speed. In this case, a ratio of a difference between the preset diving limitation speed and the current vehicle speed to the driving limitation speed, i.e., the driving speed ratio may be set to be gradually changed and hence the preset color of light emitted from the light-emitting source is gradually converted from a red-based color to a blue-based color as colors at the safety driving area so as to enable the user to promptly recognize whether or not he or she drives the vehicle at an excessive speed and a degree of deceleration. In addition, in this embodiment, it has been described that the navigation unit is implemented as a separate device different from the mode unit, and the mode unit is implemented as a switching unit, but various modifications can be made such as a modification where the mode unit is implemented as the navigation unit, if necessary.

Moreover, in the above embodiments, it has been described that the light-emitting sources of the light-emitting section which emits light is disposed in the mode unit or the display unit, but the position of the light-emitting sources of the light-emitting section according to the present invention may be selected variously.

Figure 47:
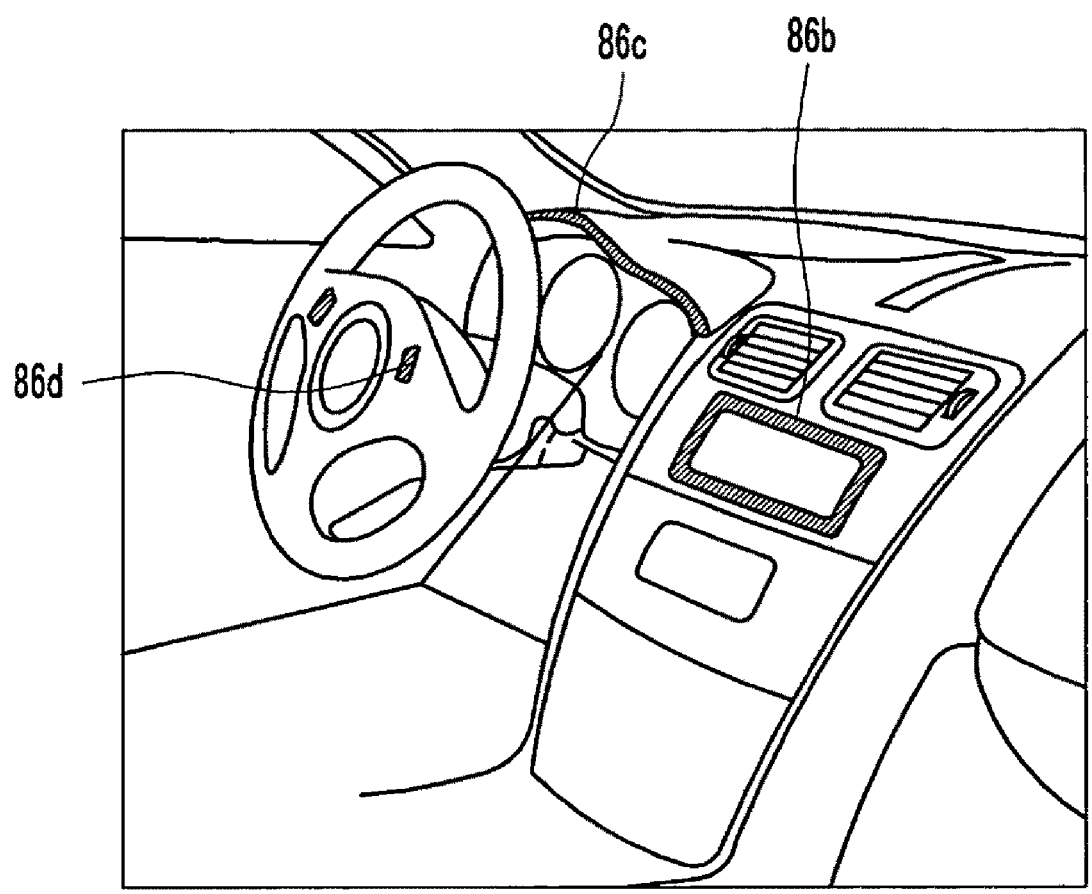
FIG. 47 is a schematic diagram showing of a modified arrangement position of a light-emitting source of a sensation system according to another embodiment of the present invention.

That is, as shown in FIG. 47, in case where the sensation system is applied to a vehicle, it may be disposed at the center fascia of the vehicle. The light-emitting section 86b of the sensation system may be disposed together with the sensation system disposed at the center fascia of the vehicle, and another light-emitting section 86c may be disposed at an edge end of a dashboard of the vehicle in such a fashion as to be positioned adjacent to a driving instrument panel and to be oriented toward the driver. Another light-emitting section 86d may be disposed at the center shaft of a steering wheel. In this manner, various modification of the positions of the light-emitting sections can be made depending on a design specification.

The above embodiments are examples for describing the present invention, and the present invention is not limited thereto. Various modifications can be made in a range of including the mode unit and the light-emitting section for emitting light corresponding to the operation of the mode unit. That is, in the above embodiments, it has been described that the sensation system is implemented as a switching unit including a haptic switching unit, a touch pad and the like, and is mounted at a vehicle, but it may implemented as a device for controlling various units of vehicles such as radios, air-conditioning devices, hands free kits, etc. Also, the sensation system may be applied to various technical fields such as aircrafts, audio devices, game machines and the like, if necessary, and may be implemented as a switching unit including a variety of user interfaces besides the touch pad.

In addition, the system housing and/or the unit housing is constructed of a single housing structure having an inner space, but may be variously modified such as having a plurality of housing structures which can be divided spaced apart from each other, if necessary.

Furthermore, the light-emitting sources of the light-emitting section may be implemented as an inorganic electroluminescent device besides the LEDs and the organic electroluminescent device. The organic electroluminescent device as a modification of the light-emitting sources has been implemented in the form of a planar light source, but may have a construction in which light of various colors can be emitted using an active electroluminescent (EL) device. Also, in the above embodiments, it has been described that the light-emitting section is implemented as a separate device from the mode unit and the to-be-controlled units (automatic transmission unit, navigation unit, air-conditioning unit), but various modifications of the light-emitting section can be made in a range of including the light-emitting sources emitting light to allow a user to recognize the operating mode in cooperation with the manipulation of the mode unit such as including a construction in which a control panel of each to-be-controlled unit is implemented as a mode unit As described above, the sensation system according to the present invention has the following advantageous effects.

First, the sensation system according to the present invention enables a user to more easily and rapidly recognize the operation state thereof through a simple optical signal emitted from the light-emitting section, thereby enhancing convenience of the user.

Second, the sensation system according to the present invention includes a light-emitting section besides the haptic actuator enabling a tactile sensation to allow a user to have a tactile sensation function and a visual sensation function so as to extend the recognition range of the user, thereby recognizing more easily and rapidly the operating state thereof.

Third, the sensation system according to the present invention includes an acoustic section besides the haptic actuator enabling a tactile sensation to allow a user to have a tactile sensation function and an audible sensation function so as to extend the recognition range of the user, thereby recognizing more easily and rapidly the operating state thereof.

Fourth, the sensation system according to the present invention additionally includes a simple constituent element to allow a user to recognize more easily and rapidly the operating state thereof, thereby ensuring a maximum operating efficiency as compared to a production cost.

Fifth, the sensation system according to the present invention further enhances easiness of the manipulation of the user interface employing a hierarchical menu selection structure, thereby enhancing rapid and easy recognition of the user for the operating state thereof through colors and/or sound.

Sixth, the sensation system according to the present invention is applied to various switches disposed at the center fascia of game machines and vehicles to as to provide an excellent feeling of manipulation to a user.

Seventh, the sensation system according to the present invention includes various application examples such that it is applied to vehicles so as to be implemented as devices having a variety of control functions such as a navigation unit, an auto-transmission unit, an air-conditioning unit and the like. Also, the operating state of each to-be controlled unit can be promptly recognized by the user through the light-emitting section, thereby ensuring a smooth driving state without degrading a driving concentration of a driver.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A sensation system comprising:
   a system housing;
   a haptic switching unit mounted at the system housing and having a haptic actuator for performing a haptic function in response to an electrical signal being inputted;
   a system control section electrically connected with the haptic switching unit for generating a control signal therefrom to control the haptic switching unit; and
   a light-emitting section electrically connected with the system control section for emitting light corresponding to each operation of the haptic switching unit in response to the control signal generated from the system control section in cooperation with the haptic switching unit,
   wherein the light-emitting section comprises:
      a light-emitting source for generating light in response to the control signal of the system control section; and
      a system optical unit mounted at a housing of the haptic switching unit in such a fashion as to be disposed adjacent to the light-emitting source for allowing light emitted from the light-emitting source to exit to the outside,
   wherein the system optical unit comprises a ring-type system optical unit having a through-hole formed therein for allowing the haptic actuator to penetrate therethrough, and
   wherein a side surface of the system optical unit forms a ring-shaped outer circumference of the system optical unit, and the light-emitting source is arranged to face the side surface of the system optical unit such that the light emitted from the light-emitting source is incident to the side surface of the system optical unit, and the system optical unit refracts and disperses the light from the light-emitting source to exit to the outside from an upper surface of the system optical unit.

2. The sensation system of claim 1, wherein the light-emitting source comprises at least one of a light-emitting diode (LED), an electroluminescent (EL) device.

3. The sensation of claim 1, wherein the light-emitting source is disposed on a line having a maximum penetrating length of the ring-type system optical unit.

4. The sensation system of claim 1, wherein the ring-type system optical unit has an optical unit mounting protrusion formed on one surface thereof, and an optical unit mounting protrusion-receiving portion is formed on an inside surface of a unit housing included in the haptic switching unit to correspond to the optical unit mounting protrusion so as to be engaged with the optical unit mounting protrusion.

5. The sensation system of claim 1, wherein the system optical unit further comprises a line-type system optical unit disposed adjacent to an outer circumference of the haptic actuator inside the unit housing.

6. The sensation system of claim 1, wherein the light-emitting source is provided in plural numbers so as to emit lights having different colors.

7. The sensation system of claim 1, further comprising a display unit mounted at the system housing and electrically connected with the haptic switching unit for displaying an operating state of the haptic switching unit.

8. The sensation system of claim 1, wherein the control signal from the system control section to the light-emitting section comprises a flickering signal for controlling light exiting from the light-emitting section.

9. The sensation system of claim 1, further comprising an acoustic section electrically connected with the system control for generating an acoustic signal corresponding to each operation of the haptic switching unit in response to the control signal generated from the system control section in cooperation with the haptic switching unit.

10. A sensation system comprising:
    a mode unit for performing a preset mode function in response to an electrical signal being inputted;
    a system control section electrically connected with the mode unit for generating a control signal therefrom to control the mode unit; and
    a light-emitting section electrically connected with the system control section for emitting light corresponding to each operation of the mode unit in response to the control signal generated from the system control section in cooperation with the mode unit,
    wherein the light-emitting section further comprises a system optical unit mounted at a unit housing of the haptic switching unit in such a fashion as to be disposed adjacent to the light-emitting source for allowing light emitted from the light-emitting source to exit to the outside, the system optical unit refracting and dispersing the light from the light-emitting source, and
    wherein the light-emitting source is arranged to face a side surface of the system optical unit such that the light emitted from the light-emitting source is incident to the side surface of the system optical unit, and the system optical unit refracts and disperses the light from the light-emitting source to exit to the outside from an upper surface of the system optical unit, the side surface.

11. The sensation system of claim 10, wherein the light-emitting section comprises a light-emitting source for generating light in response to the control signal of the system control section.

12. The sensation system of claim 11, wherein the light-emitting source comprises at least one of a light-emitting diode (LED), an electroluminescent (EL) device.

13. The sensation system of claim 11, wherein the light-emitting source is provided in plural numbers so as to emit lights having different colors.

14. The sensation system of claim 10, wherein the control signal from the system control section to the light-emitting section comprises a flickering signal for controlling light exiting from the light-emitting section.

15. The sensation system of claim 10, further comprising a display unit electrically connected with the mode unit for displaying an operating state of the mode unit.

16. The sensation system of claim 15, wherein the mode unit further comprises a touch pad.

17. The sensation system of claim 10, wherein the light-emitting section is mounted to a vehicle and further comprises:
 a light-emitting source for generating light in response to the control signal of the system control section; and
 a sensing section for sensing an ambient environment of the system control section, the sensing section comprising a temperature sensor for detecting an indoor temperature of the vehicle.

18. The sensation system of claim 17, wherein the sensing section further comprises an illumination sensor for sensing an illumination of the ambient area of the light-emitting source.

19. The sensation system of claim 18, wherein the sensing section is mounted to a vehicle and further comprises a pressure sensor for sensing whether or not a pressure is applied, the pressure sensor being mounted at a seat of the vehicle.

20. The sensation system of claim 1, wherein the system optical unit is a prism.

21. The sensation system of claim 10, wherein the system optical unit is a prism.

\* \* \* \* \*